United States Patent
Heilshorn et al.

(10) Patent No.: US 12,397,495 B2
(45) Date of Patent: Aug. 26, 2025

(54) UNIVERSAL ORTHOGONAL NETWORK BIOINKS FOR THREE-DIMENSIONAL BIOPRINTING

(71) Applicant: The Board of Trustees of the Leland Stanford Junior University, Stanford, CA (US)

(72) Inventors: Sarah C. Heilshorn, Mountain View, CA (US); Chris Lindsay, San Mateo, CA (US); Sarah Hull, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 690 days.

(21) Appl. No.: 17/637,181

(22) PCT Filed: Aug. 25, 2020

(86) PCT No.: PCT/US2020/047732
§ 371 (c)(1),
(2) Date: Feb. 22, 2022

(87) PCT Pub. No.: WO2021/041372
PCT Pub. Date: Mar. 4, 2021

(65) Prior Publication Data
US 2022/0305718 A1  Sep. 29, 2022

Related U.S. Application Data

(60) Provisional application No. 62/891,555, filed on Aug. 26, 2019.

(51) Int. Cl.
*B29C 64/106* (2017.01)
*B29C 64/209* (2017.01)
(Continued)

(52) U.S. Cl.
CPC .......... *B29C 64/106* (2017.08); *B29C 64/209* (2017.08); *B33Y 10/00* (2014.12);
(Continued)

(58) Field of Classification Search
CPC ....... B29C 64/10; B29C 64/106; B33Y 10/00; C09D 11/04; C09D 11/08
See application file for complete search history.

(56) References Cited

U.S. PATENT DOCUMENTS 9,932,297 B2  4/2018  Boons
10,150,258 B2  12/2018  Feinberg
(Continued)

FOREIGN PATENT DOCUMENTS

WO   WO-2018071639 A1 *  4/2018  ............. A61L 27/26

OTHER PUBLICATIONS

Ooi, Biomacromolecules 2018, 19, 3390-3400. (Year: 2018).*
(Continued)

*Primary Examiner* — Robert C Boyle
(74) *Attorney, Agent, or Firm* — LUMEN PATENT FIRM

(57) ABSTRACT

A method of bioprinting a bioink printed structure and a bioprinted composition resulting from this method is provided. Biological cells are mixed with biomaterial inks. These biomaterial inks have a biopolymer backbone with grafted thereto a first bio-orthogonal chemical group. The mixed biological cells and biomaterial inks are extruded into a support bath. The next step is diffusing crosslinking molecules which have a second (complementary to the first) bio-orthogonal chemical group, in the support bath, whereby the diffusing crosslinking molecules react via bioorthogonal click-chemistry between the first and second bio-orthogonal chemical groups resulting in covalently crosslinking the biomaterial ink into a printed structure. Embodiments of this invention can be directed towards personalized medicine
(Continued)

and printed tissue engineering constructs, as well as drug discovery by printing complex tissue mimics or printing model vasculature for studying cardiovascular disease.

10 Claims, 30 Drawing Sheets

(51) Int. Cl.
    *B33Y 10/00*       (2015.01)
    *B33Y 70/00*       (2020.01)
    *C09D 11/04*       (2006.01)
    *C09D 11/08*       (2006.01)
    *B29K 105/24*     (2006.01)

(52) U.S. Cl.
    CPC .............. *B33Y 70/00* (2014.12); *C09D 11/04* (2013.01); *C09D 11/08* (2013.01); *B29K 2105/24* (2013.01); *B29K 2995/0056* (2013.01); *B29K 2995/0068* (2013.01); *B29K 2995/0088* (2013.01)

(56) References Cited

U.S. PATENT DOCUMENTS

| | | |
|---|---|---|
| 2019/0022929 A1 | 1/2019 | Chaffins |
| 2019/0054206 A1 | 2/2019 | Alsberg |
| 2019/0290803 A1 | 9/2019 | Bharti |
| 2020/0131383 A1 | 4/2020 | Ke |

OTHER PUBLICATIONS

Rutz, Advanced Materials, vol. 27, Issue 9, Mar. 2015, p. 1469-1631 (Year: 2015).*
Hinton, Science Advances, vol. 1, Issue 9, Oct. 2005, p. 1-10 (Year: 2005).*
Valot et al. Chemical insights into bioinks for 3D printing. Chem Soc Rev Jul. 29, 2019;48(15):4049-4086. doi: 10.1039/c7cs00718c.

* cited by examiner

Printing Windows

Multi-Material Printing

| Support Bath | Diffusant MW [Da] | Hydrodynamic Radius [nm] | Diffusion Coefficient [μm²/s] |
|---|---|---|---|
| PLURONIC™ F-127 | 200 | <1 | 90 ± 40 |
| LIFESUPPORT™ | 200 | <1 | 87 ± 3 |
| | 40,000 | 4.7 | 18 ± 2 |

FIG. 3B

In support gel

UNIVERSAL ORTHOGONAL NETWORK BIOINKS FOR THREE-DIMENSIONAL BIOPRINTING

FIELD OF THE INVENTION

This invention relates to three-dimensional (3D) bioprinting.

BACKGROUND OF THE INVENTION

Three-dimensional (3D) bioprinting has emerged as a promising technology for producing complex, functional tissue constructs containing precisely patterned cells. However, bioprinting remains limited by the number of materials that can be used as bioinks, especially in comparison to the vast array of biomaterials developed for non-printed tissue engineering scaffolds. Since a cell's phenotype is exquisitely sensitive to the biochemical and mechanical properties of its surroundings, the matrix cues presented by the bioink will become increasingly important as bioengineers attempt to fabricate more cellularly diverse engineered tissues. Ideally, each cell type would be printed in its own customizable bioink matrix, such that the bioink is tailored to fit the cellular and structural needs of the desired tissue application. With the limited number of bioinks available today, there is a desperate need for a universal bioink strategy that can be easily customized to support any type of cell.

One factor prohibiting the use of many previously developed biomaterials as bioinks is the intrinsic difficulty of printing soft materials without support into air. To overcome this limitation, freeform printing into gel-based baths was developed to support extrusion printing of soft biological materials into complex structures. Freeform reversible embedding of suspended hydrogels (FRESH) printing involves extruding a bioink into a reversible gel support bath that provides physical reinforcement to structures like arches and overhangs, even when printing weak biomaterials. While in the support bath, the bioink is crosslinked to stabilize the printed construct, a process also known as "curing". The support bath is then liquified, typically through a change in temperature, and the bioprinted structure is removed for downstream applications. While this technique offers great improvements in fidelity and structural complexity, demonstrations have been limited to only a few materials and primarily have been used to print acellular structures. This is partly due to the limited number of effective crosslinking strategies, which contributes to the overall lack of bioink diversity.

To achieve greater bioink diversity, new crosslinking strategies are required. Many previously reported strategies have used crosslinking reactions with off-target chemical or biological reactivity that may hinder cell function (e.g. cytotoxic initiators for light-curable inks, super-physiological levels of $Ca^{2+}$ for alginate inks, and large pH shifts for collagen inks). Importantly, many of these bioink crosslinking strategies are specific to a particular biopolymer (e.g. $Ca^{2+}$ crosslinks alginate, but not collagen inks). Therefore, it is difficult to print multiple materials into a single, integrated structure. To realize the immense potential of bioprinting, it is necessary to develop a universal family of bioinks that (1) use a cell-compatible crosslinking method that works with any biopolymer, (2) can integrate together into coherent structures, (3) are versatile for use with different support baths, and (4) are biochemically and mechanically customizable for multiple cell types. The present invention addresses at least some of the problems in the art and is directed to that potential of bioprinting.

SUMMARY OF THE INVENTION

The present invention provides a method of bioprinting a bioink printed structure and a bioprinted composition resulting from this method. In the method biological cells are mixed with biomaterial inks. These biomaterial inks have a biopolymer backbone with grafted thereto two or more copies of a first bio-orthogonal chemical group. The mixed biological cells and biomaterial inks are then extruded into a support bath. The next step is diffusing crosslinking molecules which have two or more copies of a second bio-orthogonal chemical group, which are chemically complementary to the first bio-orthogonal chemical group, in the support bath containing the extruded mixture of biological cells and biomaterial inks, whereby the diffusing crosslinking molecules react via bio-orthogonal click-chemistry between the first and second bio-orthogonal chemical groups resulting in covalently crosslinking the biomaterial ink into a printed structure. Examples of the bio-orthogonal click-chemistry are strain promoted azide-alkyne cycloaddition, Staudinger ligation, inverse-electron demand Diels-Alder, Diels-Alder, Nitrile oxide cycloaddition, or tetrazine ligation.

In one embodiment, the biomaterial ink is a biocompatible polymer. In another embodiment, the biomaterial ink is a polyethylene glycol (PEG), a collagen, a dextran, a gelatin, a cellulose, an alginate, a chitosan, a fibronectin, a laminin, an elastin, a recombinant elastin-like protein, a hyaluronic acid (HA), a heparin, a heparan sulfate, a cellulose, or a decellularized extracellular matrix.

Examples of the two or more copies of a first bio-orthogonal chemical group and the second bio-orthogonal chemical group are functional groups with a strain-promoted alkyne, a dibenzylcyclooctyne, a difluorinated cyclooctyne, a bicyclononyne, an azide, a tetrazine, a norbornene, a trans-cyclooctene, a furan, a maleimide, a fulvene, a cyanoolefin dienophile, a dichloromaleic acid dienophile, a nitrile oxide, a hydroximoyl chloride, or a nitrone. It is noted, that the first and second bio-orthogonal chemical groups are chemically complementary. In other words, one can put group A on the biopolymer and group B on the crosslinking molecule.

Examples of the crosslinking molecule is a polyethylene glycol (PEG), a hyaluronic acid (HA), a heparin, a cellulose, or a peptide. In one embodiment, the crosslinking molecule has a molecular weight of 80,000 g/mol or less. Further, in yet another embodiment, the crosslinking molecule has a diffusivity through the support bath of 5 microns$^2$ per second or larger.

Examples of the support bath are a poly(ethylene oxide)-poly(propylene oxide)-poly(ethylene oxide) block copolymer, a gelatin microparticle slurry, an alginate, a gelatin, a gelatin-methacrylate, a gellan gum, an agarose, or a polyacrylic acid.

The embodiment of the bioprinted composition is defined as a biopolymer biomaterial ink with a backbone structure with grafted onto the backbone structure two or more copies of a first bio-orthogonal chemical group, and a crosslinking molecule with two or more copies of a second bio-orthogonal chemical group which are chemically complementary to the first biorthogonal chemical group, wherein the first biorthogonal chemical group and the second biorthogonal chemical group are covalently crosslinked together. In one embodiment, the bioprinted composition could further include biological cells distributed within the bioprinted composition.

3D bioprinting offers the most advantages in applications that require a large degree of customization from part to part. This is best exemplified with personalized medicine and printed tissue engineering constructs. With this technique, personalized skin samples could be printed from a patient's own cells for skin grafts, or printed replacement tissue for large bone defects in plastic surgery. Outside of personalized medicine, this technique could be used for drug discovery by printing complex tissue mimics or printing model vasculature for studying cardiovascular disease. This technique is designed to be orthogonal to other printing components and cellular functions, and as such, has the potential to be used in most 3D bioprinting applications.

There are several key advantages of this crosslinking strategy when compared to other 3D bioprinting methods. First, bio-orthogonal functional groups can be appended onto most polymer backbones, and diffusive molecules can come in many sizes and functionalities. Thus, diffusive fixation (i.e. crosslinking) using bio-orthogonal crosslinkers can be applied to many different bioink formulations. Hence, this method is highly versatile and enables bioprinting of a wide range of different bioink materials. In comparison, other bioprinting methods tend to be restricted to use with only a few types of bioink materials. Second, the method of diffusive fixation enables independent specification of the bioink mechanics pre-printing and post-printing, since the bio-orthogonal fixation reaction only occurs post-printing. Thus, the bioink can be formulated to have pre-printing mechanical properties that enable high fidelity printing (e.g. optimization of the bioink viscosity), while the post-printing mechanical properties can be selected to promote biocompatibility. In comparison, for other bioprinting methods, the pre-printing mechanics and post-printing mechanics of the bioink are coupled, thus a much smaller range of post-printing mechanics are achievable (since only those bioinks with pre-printing mechanics that enable actual printing are possible for use). Third, bio-orthogonal crosslinking of the bioink guarantees a cytocompatible crosslinking environment for production of cell-laden 3D bioprinted constructs. In contrast, other bioprinting methods expose the cells to chemical reactions that have cross-reactivity with chemical groups on the cell surface and/or expose the cells to non-physiological conditions. For example, one type of support bath bioprinting method using collagen bioink materials requires pH conditions that cause cell death. Another type of support bath bioprinting method using alginate bioink materials requires exposure to non-physiological concentrations of calcium ions. Yet other printing methods require exposure to toxic photo-initiators and ultraviolet (UV) light, which can damage DNA and other biomolecules. Fourth, bio-orthogonal diffusive crosslinking ensures that the bioink and any encapsulated cells are kept fully hydrated during the printing process, by immersing the bioink within a water-based support bath. In contrast, many bioprinting methods that rely on UV fixation require printing onto a stage in air, which exposes the bioink and cells to dehydration, leading to cell death. Fifth, the bio-orthogonal diffusive crosslinking enables for the printing of two or more bioinks, each with distinct cellular content and material properties, into a cohesive, covalently linked construct. Each bioink can be composed of a different biopolymer to select the biochemistry and biomechanics required for the encapsulated cellular cargo. Even though each bioink is a distinct biopolymer, because they use a common bioorthogonal crosslinking reaction, a cohesive interface is formed between the different bioinks.

BRIEF DESCRIPTION OF THE DRAWINGS

FIG. 1A shows UNION bioinks 110 mixed with cells 120 in a syringe and extruded into gel support baths. FIG. 1B shows UNION crosslinkers with complementary chemical groups diffuse into printed UNION bioinks and covalently crosslink the biopolymer into a network. FIG. 1C shows strain-promoted azide-alkyne cycloaddition (SPAAC) copper-free "click" chemistry as a specific, robust, and cytocompatible bioorthogonal chemistry for crosslinking between azides and bicyclononynes in UNION bioprinting. FIG. 1D shows UNION crosslinkers including a small diazide-PEG (MW 200 Da), and a larger tetra-BCN-PEG (MW 20,000 Da).

FIG. 2A shows Gelatin-BCN disks printed into a LIFESUPPORT™ bath with diazide-PEG crosslinker at room temperature (left). The printed disks are allowed to crosslink for 1 hour and are then removed by heating to 37 degrees Celsius (right). FIG. 2B shows HA-azide bioinks printed into complex structures that include windows and overhangs in a LIFESUPPORT™ bath with tetra-BCN-PEG crosslinkers. FIG. 2C shows Gelatin-BCN ("red") and PEG-BCN ("blue") bioinks printed side-by-side into a cohesive 3D checkerboard structure in LIFESUPPORT™ with diazide-PEG crosslinker. FIGS. 2D-G shows UNION bioinks fabricated from (FIG. 2D) gelatin-BCN, (FIG. 2E) PEG-BCN, (FIG. 2F) HA-azide, and (FIG. 2G) ELP-azide with their corresponding UNION crosslinker (FIGS. 2D-E, diazide-PEG; FIGS. 2F-G, tetra-BCN-PEG) form robust gels (G'>G", where filled markers are the storage moduli, G', and open markers are the loss moduli, G") with a range of mechanical stiffness, n=3.

FIGS. 3A-C show according to an exemplary embodiment of the invention UNION crosslinkers diffuse through gel support baths and UNION bioinks. FIG. 3A shows a PEG-BCN bioinks successfully print discs in both 26% (w/v) PLURONIC™ F-127 (left) and LIFESUPPORT™ (right) baths. FIG. 3B shows small (fluorescently-tagged, 200-Da diazide-PEG) and large (fluorescently-tagged, 40,000-Da dextran) molecules diffused through PLURONIC™ and LIFESUPPORT™ baths, n=3. FIG. 3C shows diffusion of fluorescently-tagged dextran (MW 10,000 Da) which does not significantly change as gelatin-BCN or PEG-BCN UNION bioinks become crosslinked into gels, n=3.

FIG. 4A (Left) shows printed human corneal mesenchymal stromal cells (c-MSCs) in gelatin-BCN UNION bioinks retaining high viability (98%) 24 hours after printing in LIFESUPPORT™ as tested by a Live/Dead cytotoxicity assay, n=3. (Right) Cytoskeletal staining reveals well spread c-MSCs that stain positive for corneal mesenchymal stromal cell marker aldehyde dehydrogenase 3A1 (ALDH3A1) and proliferation marker Ki-67 after 7 days in printed gelatin-BCN UNION bioinks. FIG. 4B (Left) shows human induced pluripotent stem cell-derived neural progenitor cell (hiPSC-NPC) spheroids printed in PEG-BCN bioinks maintaining a highly viable core after 24 hours. (Right) NPC spheroids maintain a stem-cell phenotype as demonstrated by positive staining for the neural stem cell markers nestin and Sox2 after 3 days in culture in printed PEG-BCN UNION bioinks.

FIG. 5A shows a Gelatin-BCN and FIG. 5B shows a PEG-BCN reaching their final modulus within 30 minutes following reaction with diazide-PEG. FIG. 5C shows HA-azide and FIG. 5D shows ELP-azide hydrogels reaching their final modulus within 30 minutes following reaction with tetra-BCN-PEG.

FIG. 6A shows FITC-labeled diazide-PEG diffused away from a 26% PLURONIC™ support bath inside of a custom-built dialysis cassette and chamber. FIG. 6B shows representative FRAP images for FITC-labeled diazide-PEG (initial MW 200 Da) and FITC-dextran (MW 40,000 Da) in LIFESUPPORT™, showing representative pre- and post-bleaching frames. FIG. 6C shows Fluorescence recovery in LIFESUPPORT™ baths.

FIG. 9A shows the structure, FIG. 9B shows the structure as printed in the support gel, and FIG. 9C shows the structure after release from the support gel. This method can be used to print clinically useful shapes such as corneal lenses with embedded viable cells.

DETAILED DESCRIPTION

This invention provides the development of a universal bioink strategy that uses a bioorthogonal crosslinking mechanism to enable freeform bioprinting of any cell type with any biopolymer. Family of materials that are useful for this universal bioink strategy is herein referred to as UNIversal, Orthogonal Network (UNION) bioinks. This strategy provides a toolkit of bioinks that can be customized for specific biological applications without redesigning the crosslinking strategy for each bioink used. Furthermore, because each individual bioink uses the same bioorthogonal crosslinking chemistry, multiple inks can be printed together into a single, cohesive construct. Bioorthogonal chemistries enable the rapid formation of a covalent bond between two distinct, complementary chemical functional groups. These reactions are ideally suited for bioprinting since they are chemically specific, produce no toxic side products, proceed rapidly under ambient conditions, and can be designed to proceed without external catalysts or triggers. Thus, bioorthogonally crosslinked bioinks have no cross-reactivity with other biomolecules, including those present on the surface of cells, in the culture medium, or in the ink itself, making this a truly universal strategy.

Figure 1A:
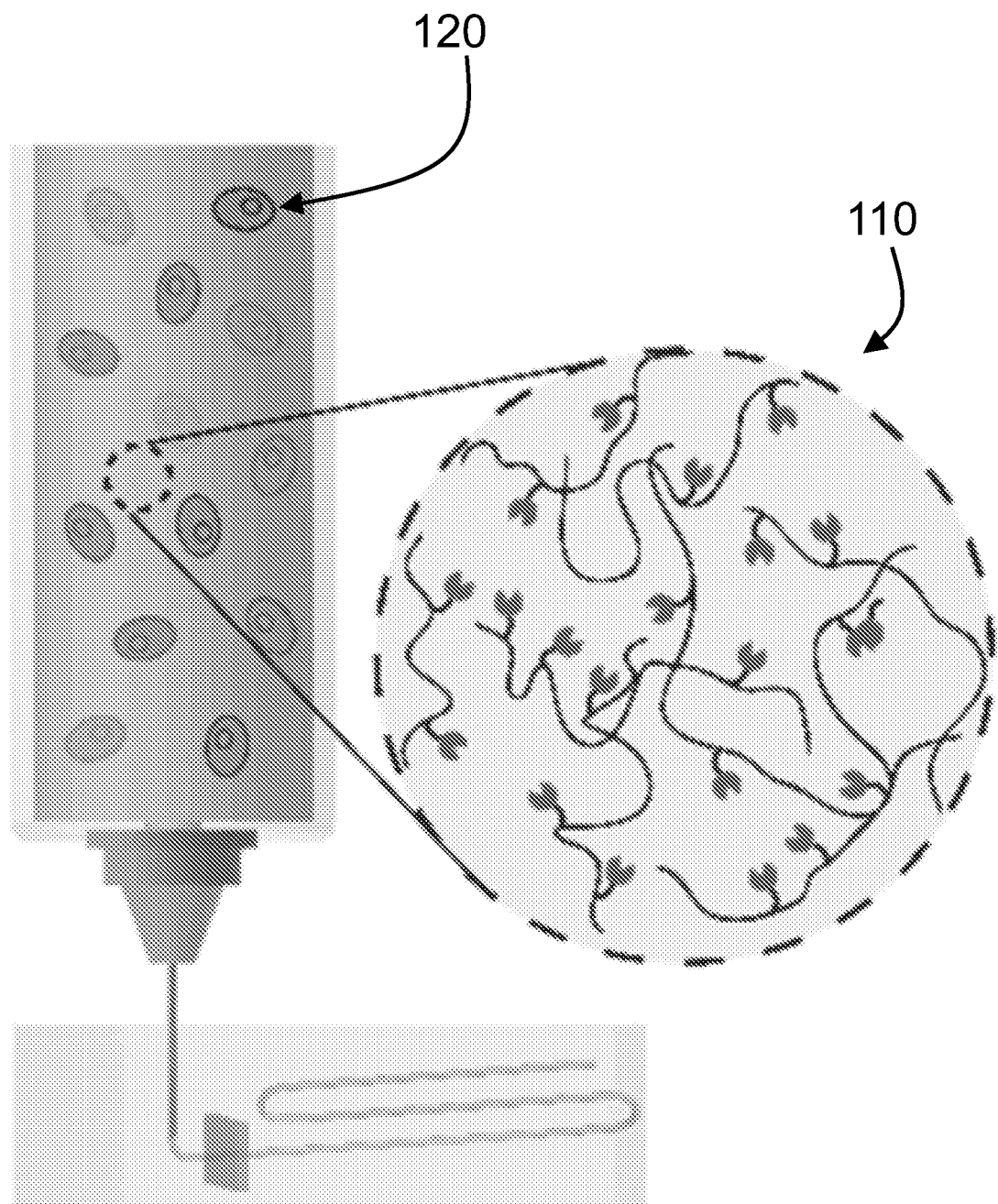
FIGS. 1A-D show according to an exemplary embodiment of the invention UNIversal Orthogonal Network (UNION) bioprinting in a support bath uses diffusable crosslinkers to enable bioorthogonal stabilization of UNION bioinks.
Figure 1B:
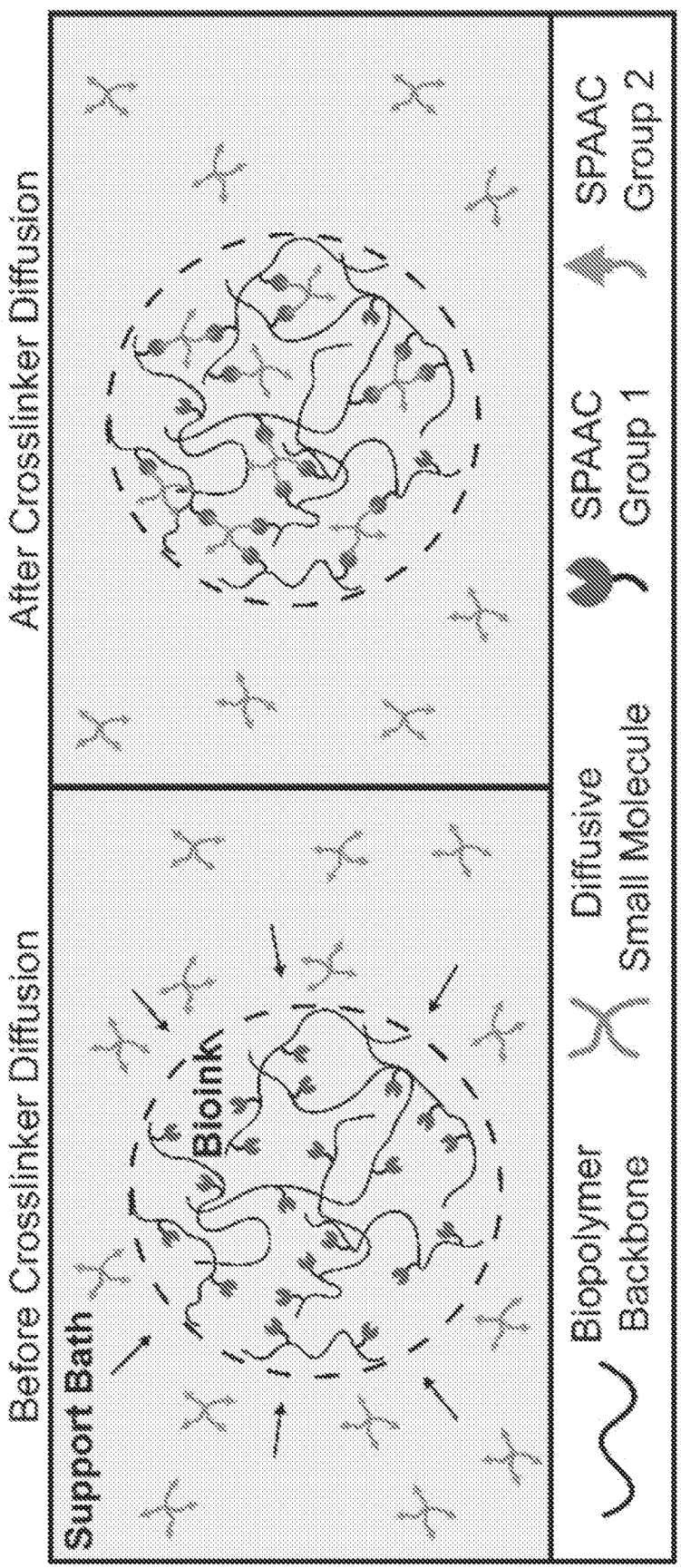

UNION bioinks are prepared by grafting one of the bioorthogonal chemical groups onto the backbone of a biopolymer prior to mixing with cells (FIG. 1A). The complementary biorthogonal chemical group is presented on a crosslinking molecule that is added into the support bath prior to printing (FIG. 1B). After the UNION bioink is extruded into the bath, the crosslinkers passively diffuse into the printed structure and spontaneously react with the bioink, covalently crosslinking the polymer to stiffen and stabilize the final structure. Once the gel support bath has been liquified, the final printed structure can be removed.

Figure 1C:
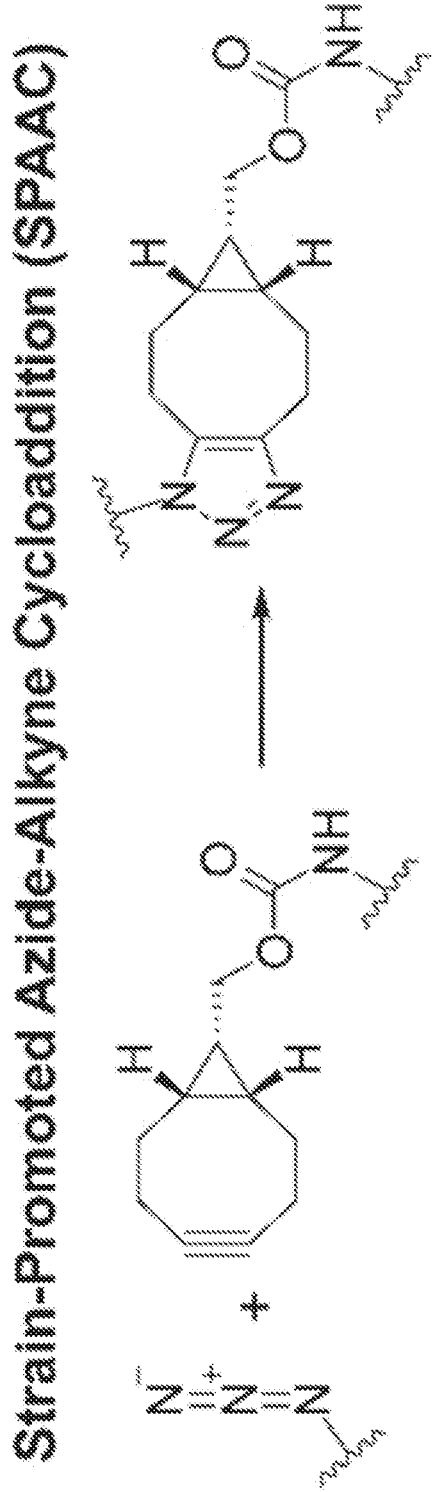

To produce a universal crosslinking scheme, the bioorthogonal strain-promoted azide-alkyne cycloaddition (SPAAC) reaction was chosen to use between azides and bicyclononynes (BCN) (FIG. 1C). This is a water-stable form of copper-free, click-chemistry with reasonable reaction kinetics for homogeneous encapsulation of cells within hydrogels. The selectivity of SPAAC reactions ensures that once the bioorthogonal groups are grafted onto a biopolymer, they will only be crosslinked by the corresponding bioorthogonal partner group and will not cross react with unmodified polymers or any chemical species presented by a cell. To demonstrate the versatility of this crosslinking strategy, gelatin and polyethylene glycol (PEG) were chosen as examples of natural and synthetic polymers for BCN grafting. Both polymers were functionalized under anhydrous conditions using N-hydroxysuccinimide (NHS) ester amidation of primary amines. In a parallel demonstration, hyaluronic acid (HA) and a recombinant elastin-like protein (ELP) were functionalized with azide functional groups, again as examples of a natural polymer and an engineered polymer. Thus, for the purposes of this invention four exemplary bioinks in total were prepared: gelatin-BCN, PEG-BCN, HA-azide, and ELP-azide.

Figure 1D:
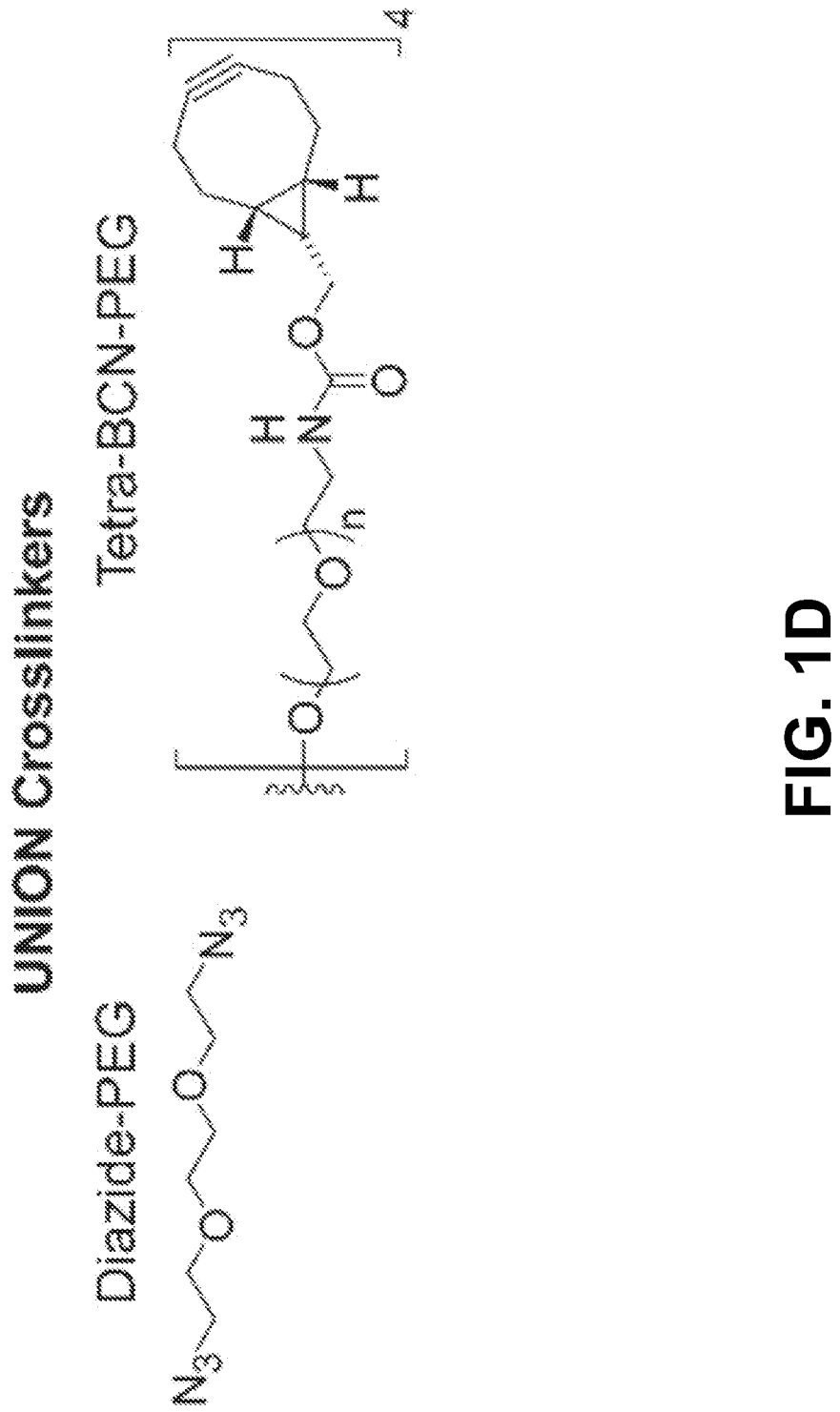

Crosslinkers for UNION bioinks must be (i) multifunctional (i.e. have 2 or more reactive groups) to crosslink the printed biopolymer into a stable network, and (ii) soluble to enable diffusion through the gel support bath. For the BCN-functionalized inks, a small molecule diazide-PEG (MW 200 Da, FIG. 1D) was purchased for use as a crosslinker. In comparison to the highly hydrophilic azide groups, BCN functional groups are hydrophobic, and typically need to be attached to large hydrophilic polymers to remain soluble at a usable crosslinking concentration. It was determined that functionalization of a multi-arm PEG at a ratio of one BCN functional group per ~5 kDa of PEG was sufficient for solubility up to at least 10 mg/mL. Therefore, a tetra-BCN-PEG (MW 20 kDa, FIG. 1D) was synthesized for use as a crosslinker for the azide-modified bioinks.

Figure 2A:
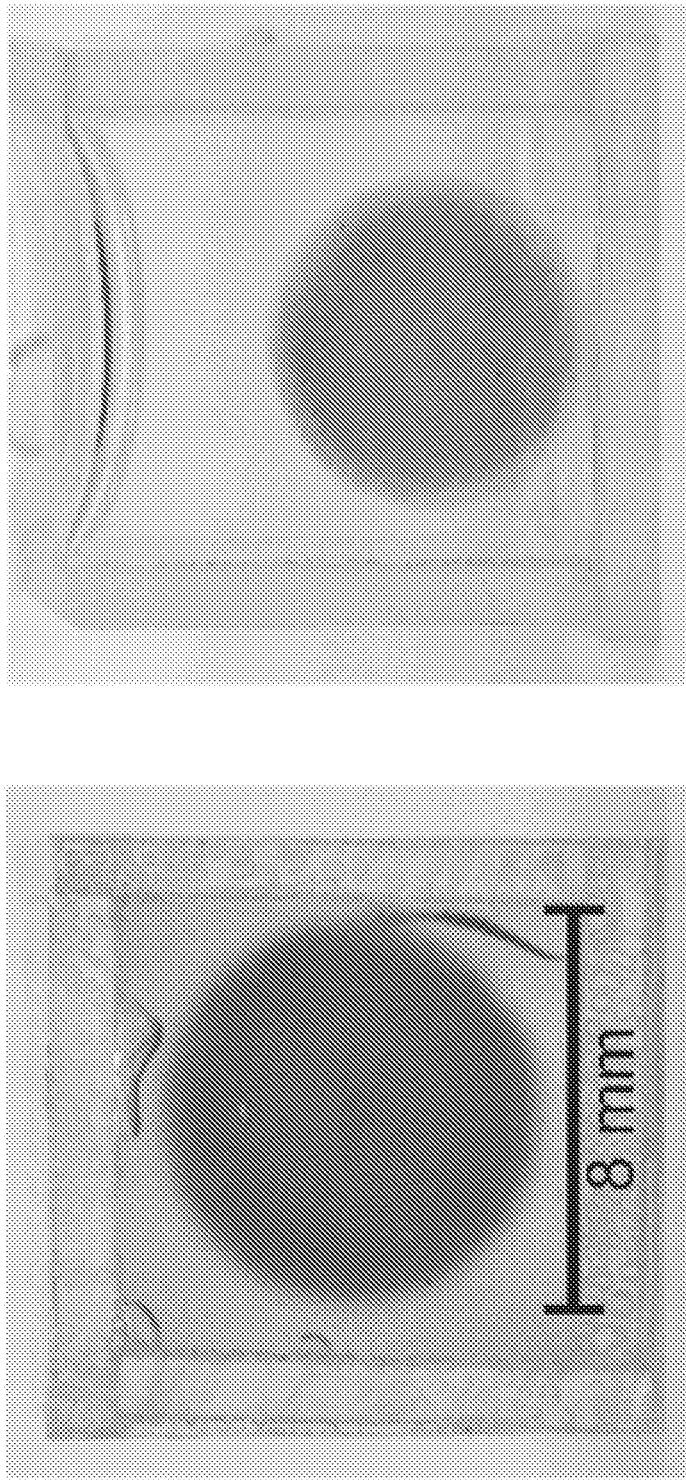
FIGS. 2A-G show according to an exemplary embodiment of the invention UNION bioinks formulated from a range of biopolymers.

Using freeform microextrusion printing techniques, UNION bioinks can be printed into any shape in a gel support bath using any biopolymer that can be effectively grafted with multiple SPAAC functional groups. As a first demonstration, simple disk structures were printed using the functionalized bioink materials into a commercially available gel support bath for FRESH printing. The LIFESUP- PORT™ bath is a slurry of gelatin microparticles that provides support during printing and can then be melted away at 37 degrees Celsius. The appropriate crosslinker (either diazide-PEG or tetra-BCN-PEG) is added to the support bath during hydration of the gelatin microparticles to achieve a final concentration of 1 mg/mL. Using a custom syringe-based extruder, 8 mm×0.5 mm disks were printed using the gelatin-BCN ink into a LIFESUPPORT™ bath containing diazide crosslinkers at room temperature (FIG. 2A, left). The printed structures were allowed to cure for 1 hour in the gel support bath at room temperature to facilitate crosslinking before heating to 37 degrees Celsius for 15 min to melt and remove the gelatin support bath (FIG. 2A, right).

Figure 2B:
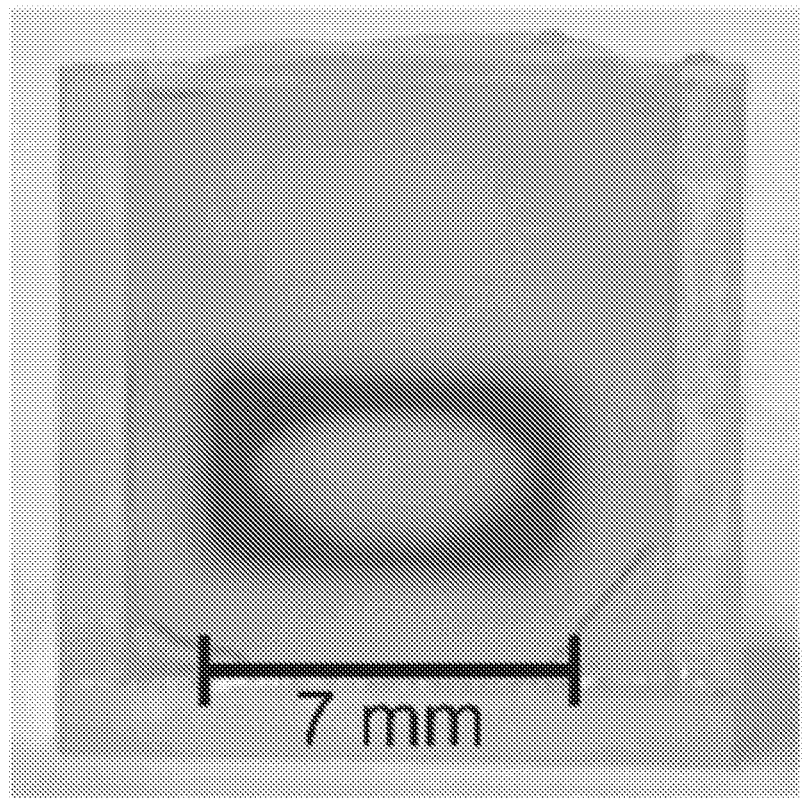
Figure 2C:
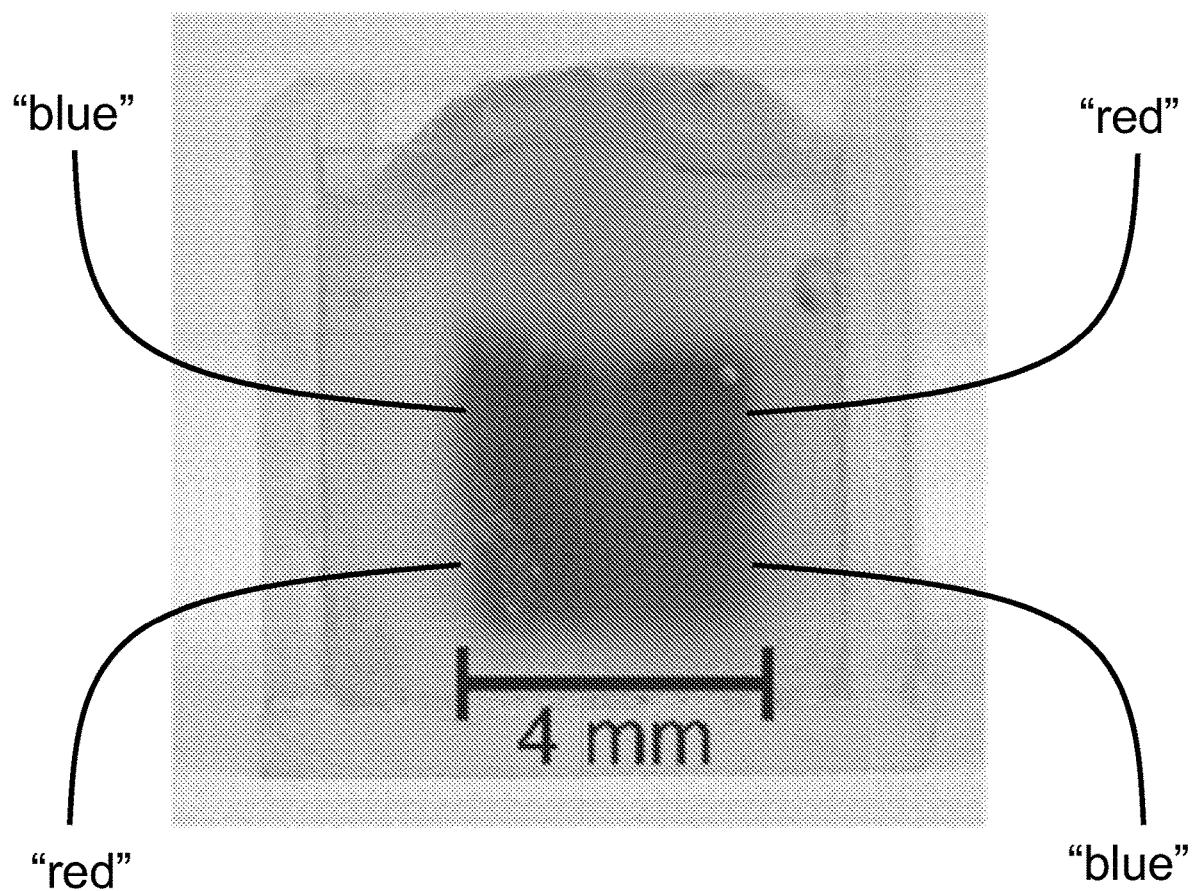
Figure 2D:
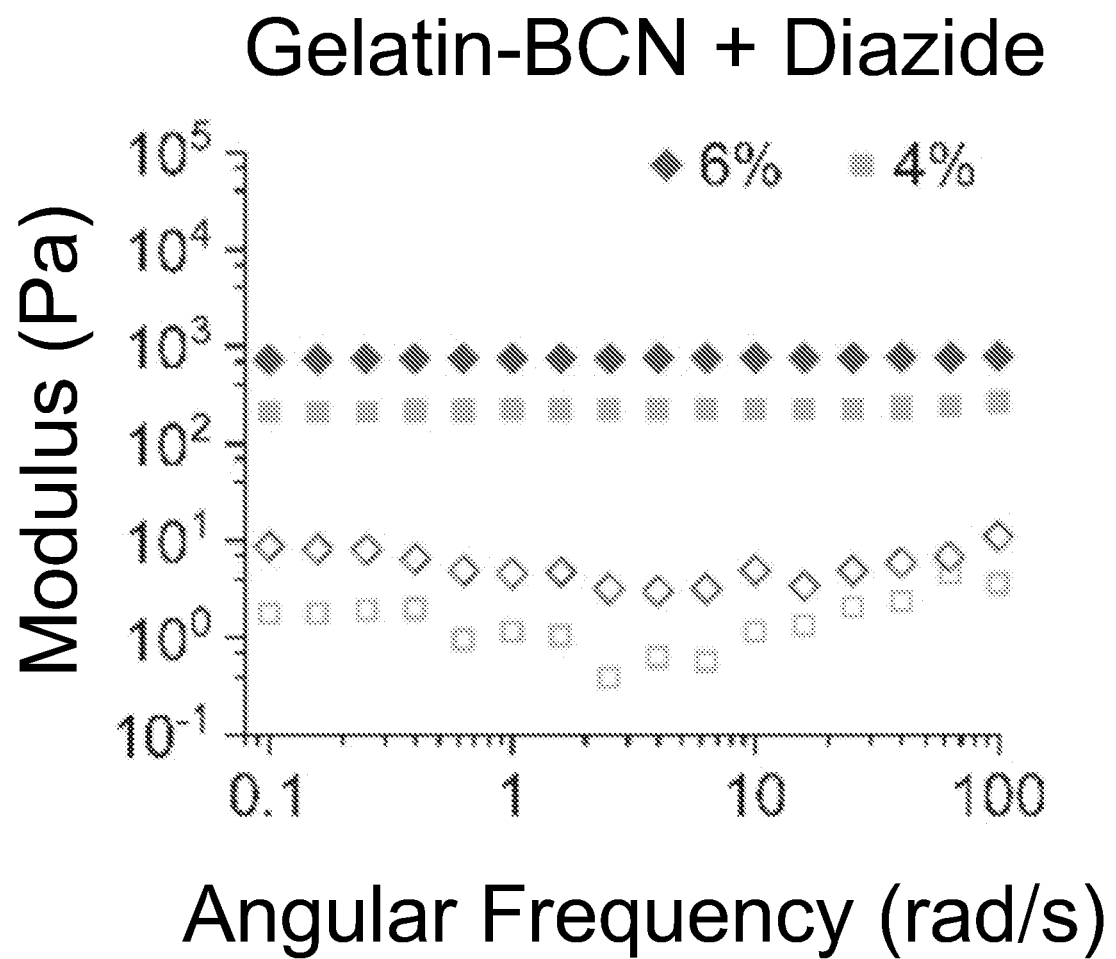
Figure 2E:
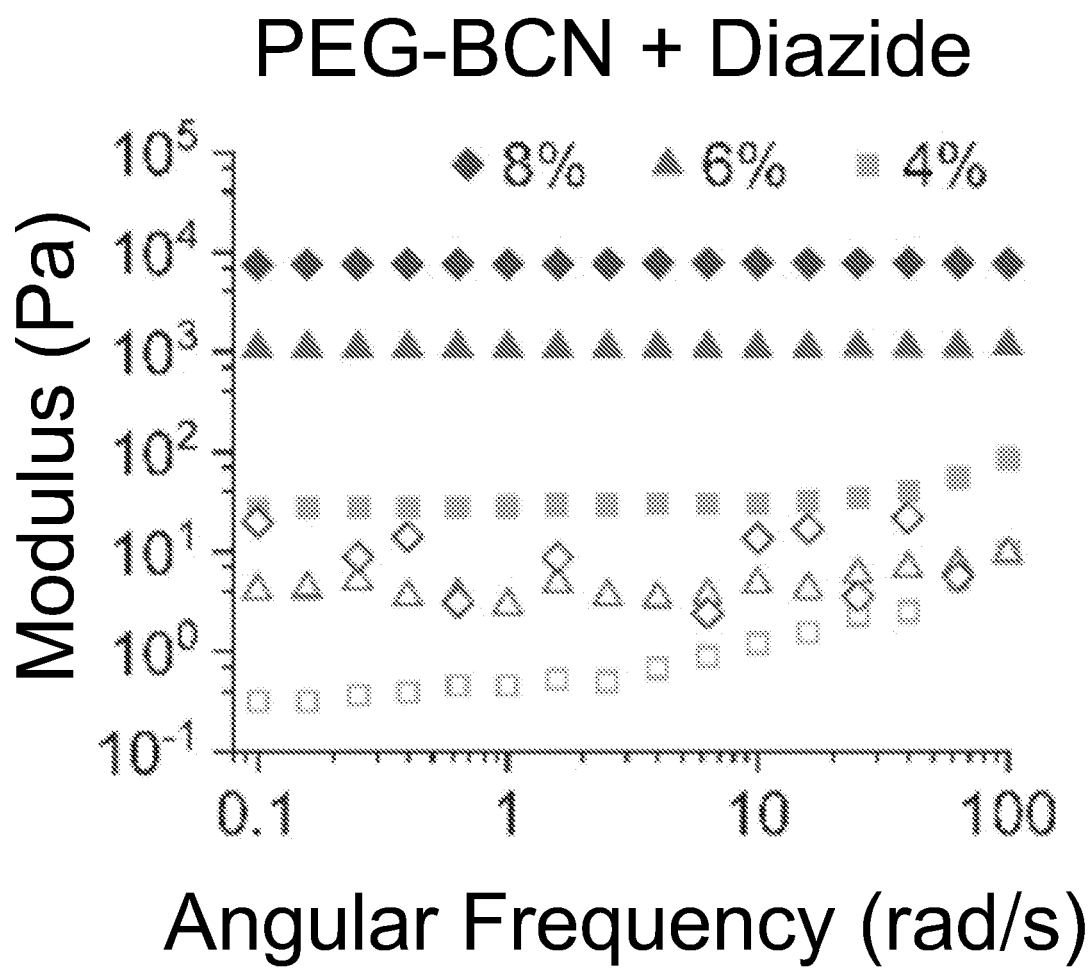
Figure 2F:
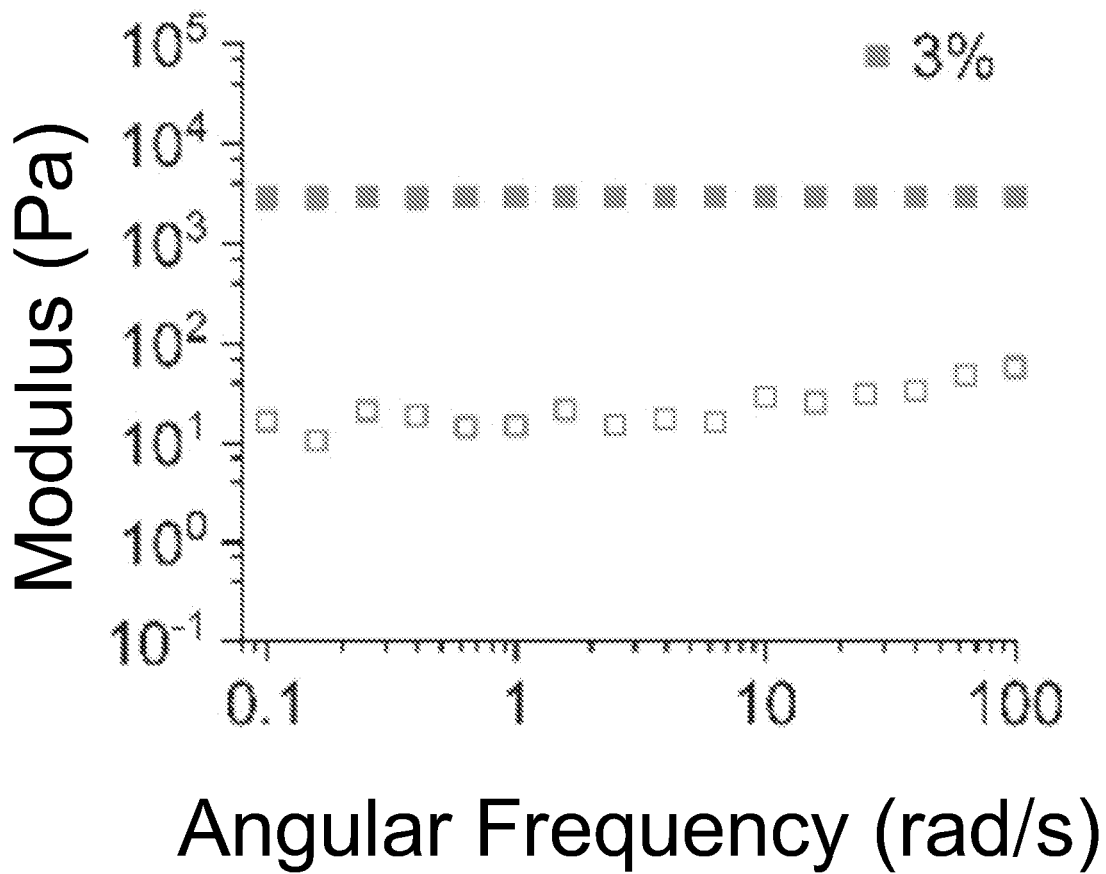
Figure 2G:
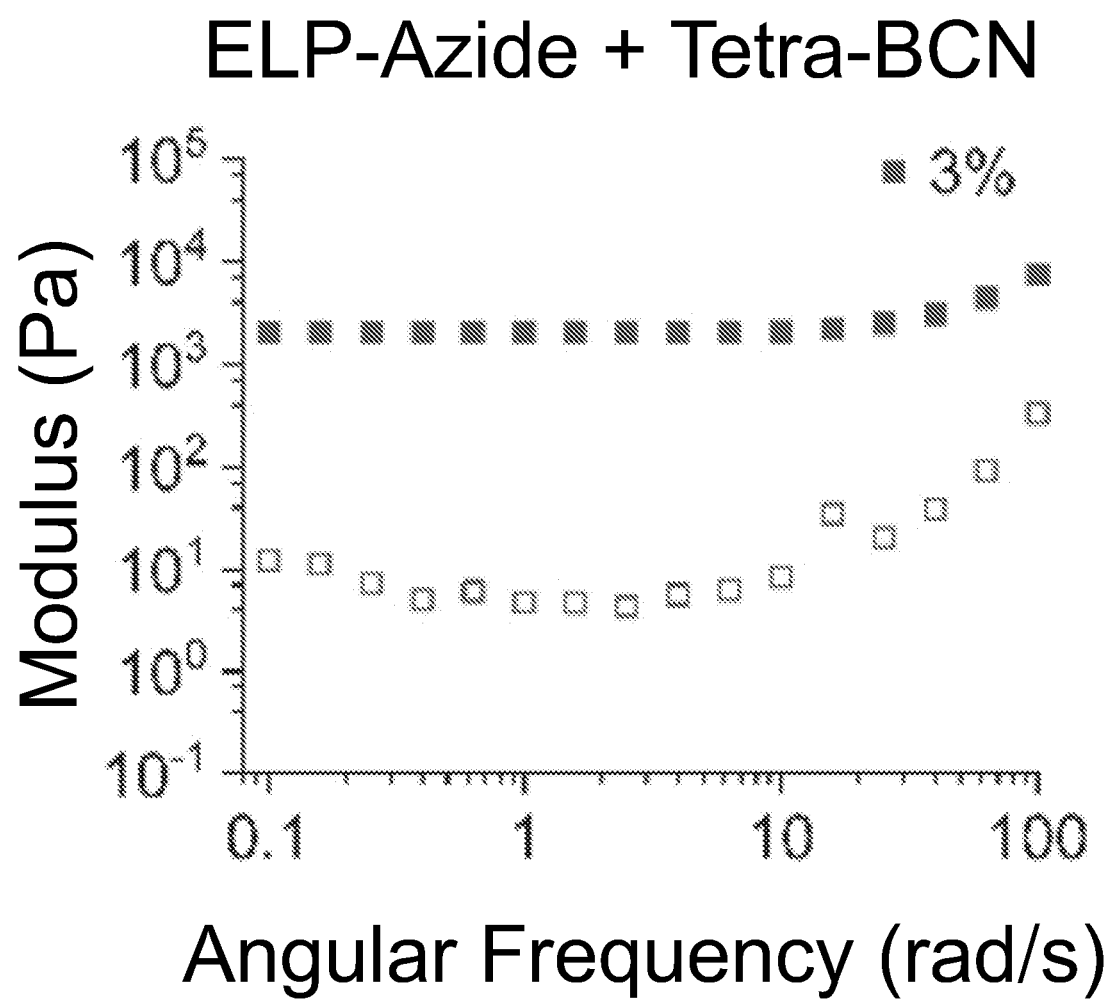
Figure 7:
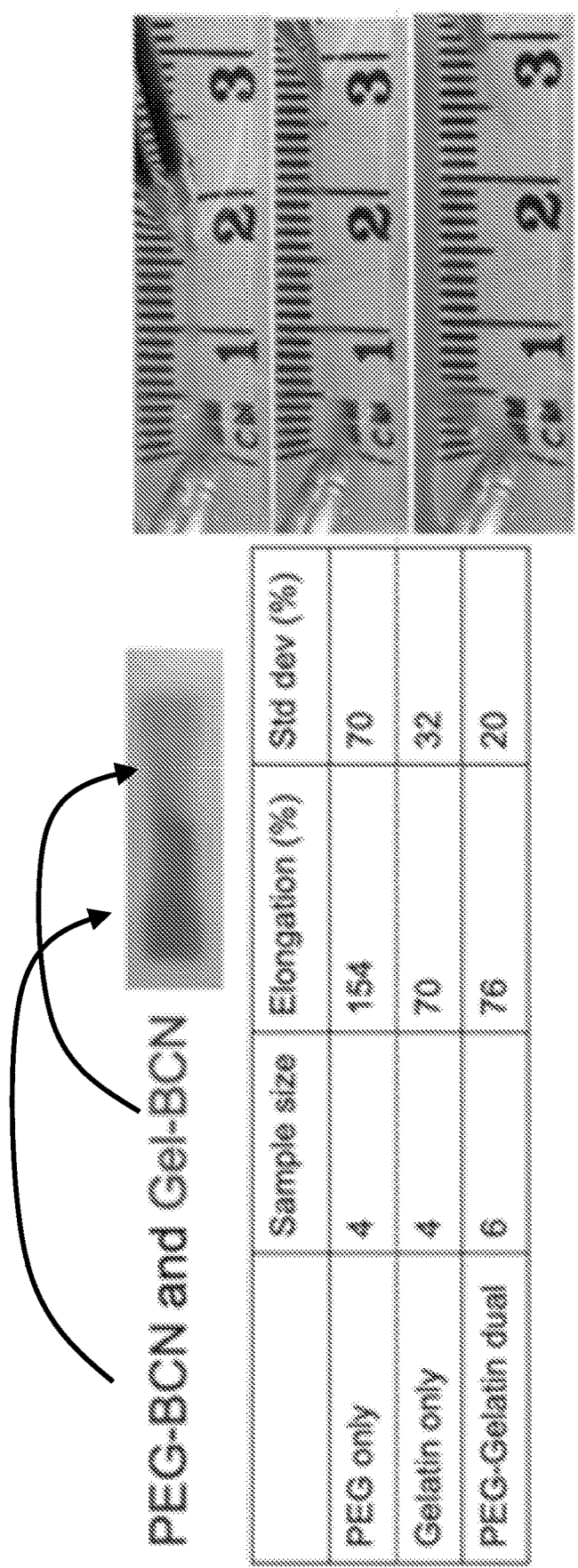
FIG. 7 show according to an exemplary embodiment of the invention cohesive interface between dual-material prints. Elongation to break for a printed construct showed good cohesion between the PEG-BCN and Gelatin-BCN interface when crosslinked with diazide-PEG.
Figure 8:
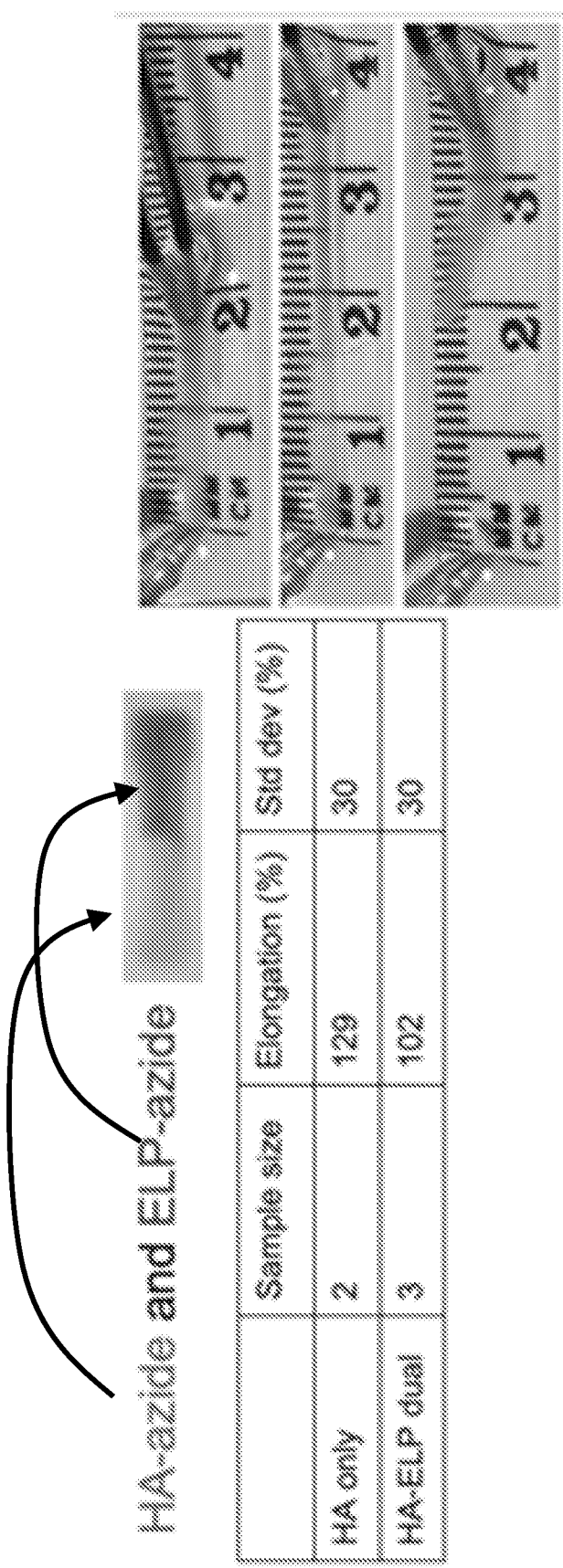
FIG. 8 show according to an exemplary embodiment of the invention cohesive interface between dual-material prints. Elongation to break for a printed construct showed good cohesion between the HA-Azide and ELP-Azide interface when crosslinked with Tetra-BCN-PEG.

To demonstrate the versatility of this biorthogonal crosslinking strategy for use with other biopolymers, an HA-azide ink was printed next into a LIFESUPPORT™ bath containing tetra-BCN crosslinkers (1 mg/mL). Important to note is that the presence of the crosslinker did not alter the support function of the gel bath, which still allowed for the printing of constructs with windows and overhangs (FIG. 2B). Here, an elliptical window is supported by the LIFESUPPORT™ bath without crowning or deformation, demonstrating controlled FRESH printing of UNION bioinks in a support bath containing crosslinkers. Introducing a UNION crosslinker also allows for more complexity in the printed structure by allowing multiple bioinks to be printed and crosslinked together using the same bioorthogonal chemistry. As a demonstration, gelatin-BCN and PEG-BCN polymers were printed simultaneously in the same support bath containing diazide-PEG and were effectively crosslinked together to form a single integrated structure (FIG. 2C). Printing these two inks into a dogbone structure for uniaxial tensile mechanical testing demonstrated formation of a cohesive interface between the gelatin-BCN and PEG-BCN inks that withstood 76% elongation prior to break (FIG. 7). Similarly, HA-azide ink and ELP-azide ink were printed into a support bath containing the tetra-BCN-PEG crosslinker to form a cohesive structure. Upon uniaxial tensile testing, the HA-azide and ELP-azide structure demonstrated formation of a cohesive interface by withstanding 102% elongation prior to break (FIG. 8). Because UNION bioinks rely on a biorthogonal reaction, they are also compatible with other bioink curing strategies (e.g. enzymatic, electrostatic, or photo-crosslinking) that could be used alongside this technique.

The UNION bioink strategy is compatible with any biopolymer that is water soluble, amenable to conjugation chemistry, and can be printed. Here, gelatin-BCN (FIG. 2D), PEG-BCN (FIG. 2E), HA-azide (FIG. 2F) and ELP-azide (FIG. 2G) are all demonstrated to produce robust hydrogels (storage moduli >1000 Pa) when mixed with their corresponding UNION crosslinker (FIGS. 5A-D). Thus, the biochemistry of the printed construct can be tuned by choosing an appropriate biopolymer to suit the cellular needs of a specific application. Similarly, multiple biopolymers conjugated with the same SPAAC reactive group could be mixed to create an infinite library of bioinks with different polymer blends for further customization. As cells are known to respond to mechanical cues present in their microenvironment, the inventors also explored the tunability of the bioink mechanics. Here, the final hydrogel stiffness was varied from 200 Pa to 10,000 Pa simply by changing the biopolymer weight percentage (FIGS. 2D-G). Thus, using the UNION strategy, new bioink combinations can be produced to match the mechanical and biochemical requirements of a wide array of 3D bioprinting applications, introducing versatility not previously found in other bioink designs.

Next, the versatility of UNION bioinks was shown to also extend to the choice of support bath and crosslinker. Both a 26 wt % (w/v) PLURONIC™ F-127 support bath (FIG. 3A, right) and the herein described gelatin microparticle support bath (LIFESUPPORT™, FIG. 3A, left) are compatible with UNION bioinks and crosslinkers. To achieve homogeneous crosslinking for stabilization of the printed structure, the UNION crosslinkers must be able to diffuse through the support bath and through the crosslinked bioink. Fluorescently labeled diffusants of various sizes were used to quantify diffusivity. The diazide-PEG crosslinker had a comparable diffusion coefficient in the PLURONIC™ support bath (90 $\mu m^2 s^{-1}$) as in the LIFESUPPORT™ bath (87 $\mu m^2 s^{-1}$) (FIG. 3B, FIGS. 6A-C). As expected, this is less than the theoretical Stokes-Einstein diffusion coefficient in water (~250 $\mu m^2 s^{-1}$) since the support baths are both gel phase. In comparison, a larger diffusant (40 kDa dextran with a hydrodynamic radius ($R_H$) about five times larger than diazide-PEG) had a smaller diffusion coefficient in LIFESUPPORT™ (18 $\mu m^2 s^{-1}$), which again was less than the theoretical diffusion coefficient in water (~50 $\mu m^2 s^{-1}$). As expected, the diffusion coefficients (D) for these two different diffusants scale inversely with their hydrodynamic radii (i.e. D~$1/R_H$). Compatibility with UNION bioinks should extend to all available aqueous support baths without concern for chemical compatibility due to the bioorthogonal nature of the crosslinking chemistry, so long as they allow diffusion of the crosslinkers into the printed bioink.

Figure 3A:
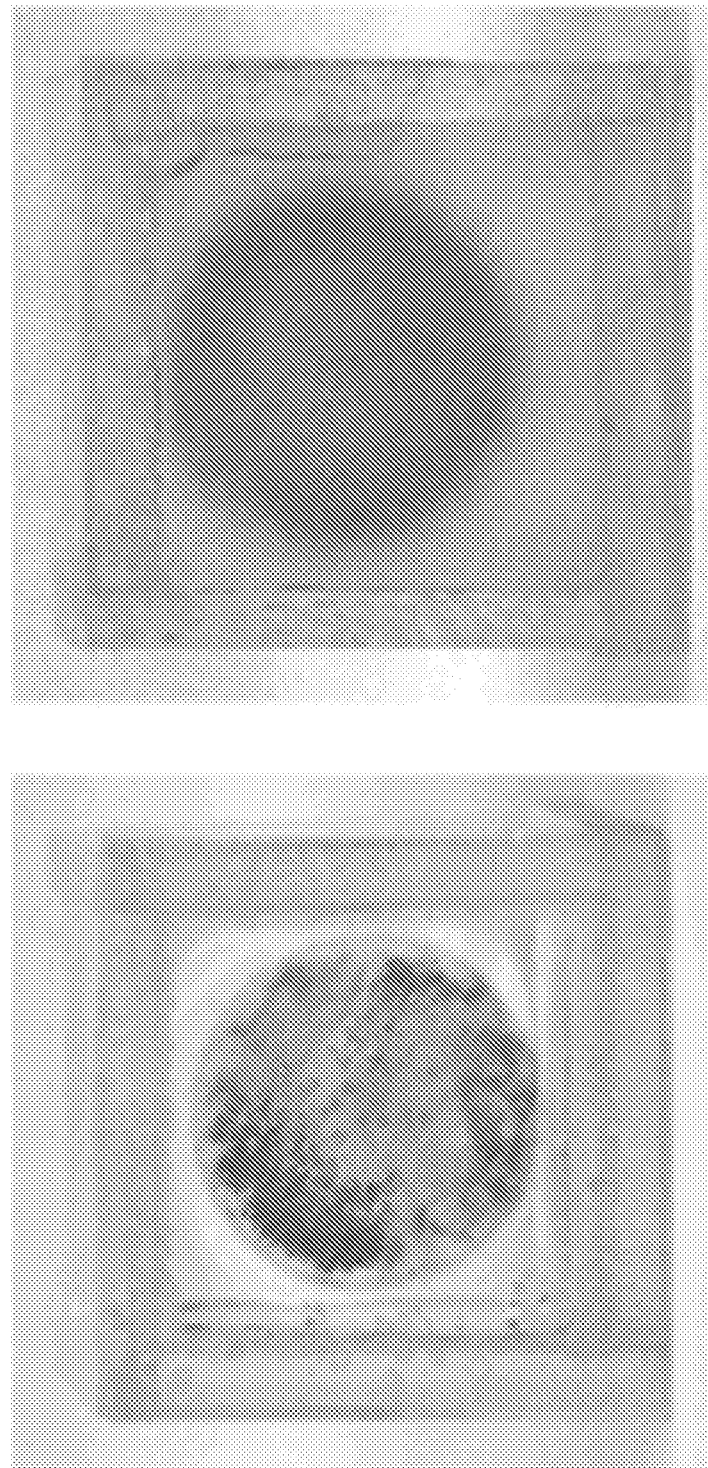
Figure 3C:
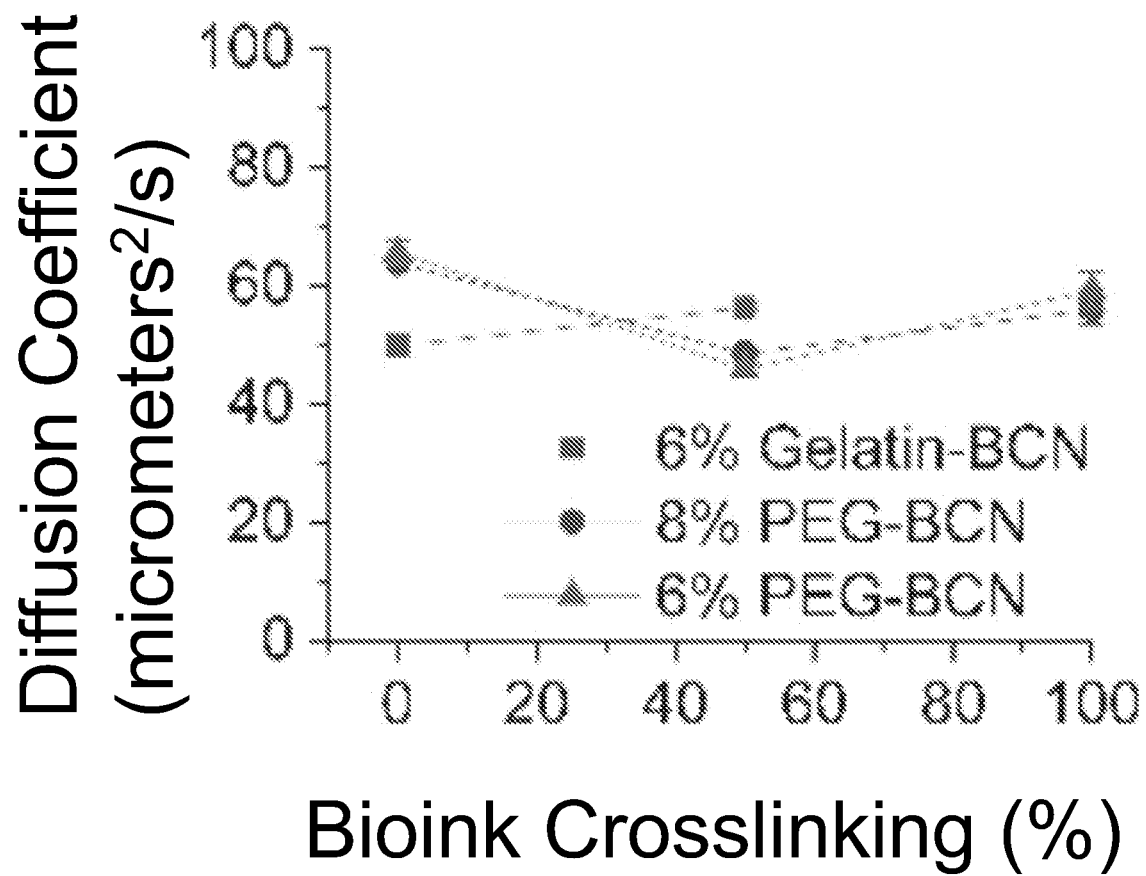

Similar to the necessity for crosslinker transport through the support bath, the crosslinker must also diffuse through the printed bioink to achieve homogeneous crosslinking throughout the hydrogel network. Polymer crosslinking into a hydrogel network is known to potentially reduce the diffusion coefficient depending on the diffusant size relative to the hydrogel network mesh size. A fluorescently-labeled diffusant with a size similar to that of the larger UNION crosslinker (10 kDa dextran, $R_H$~2.3 nm) was chosen, but which lacked any reactive groups and thus would not alter the network mesh size while diffusing through the hydrogel. The diffusion coefficient was determined to be similar (~60 $\mu m^2 s^{-1}$) in both gelatin-BCN and PEG-BCN networks, regardless of the extent of crosslinking (FIG. 3C). These data suggest that even when fully crosslinked, the network mesh size of UNION bioinks is sufficiently large to enable the diffusion of UNION crosslinkers.

Figure 4A:
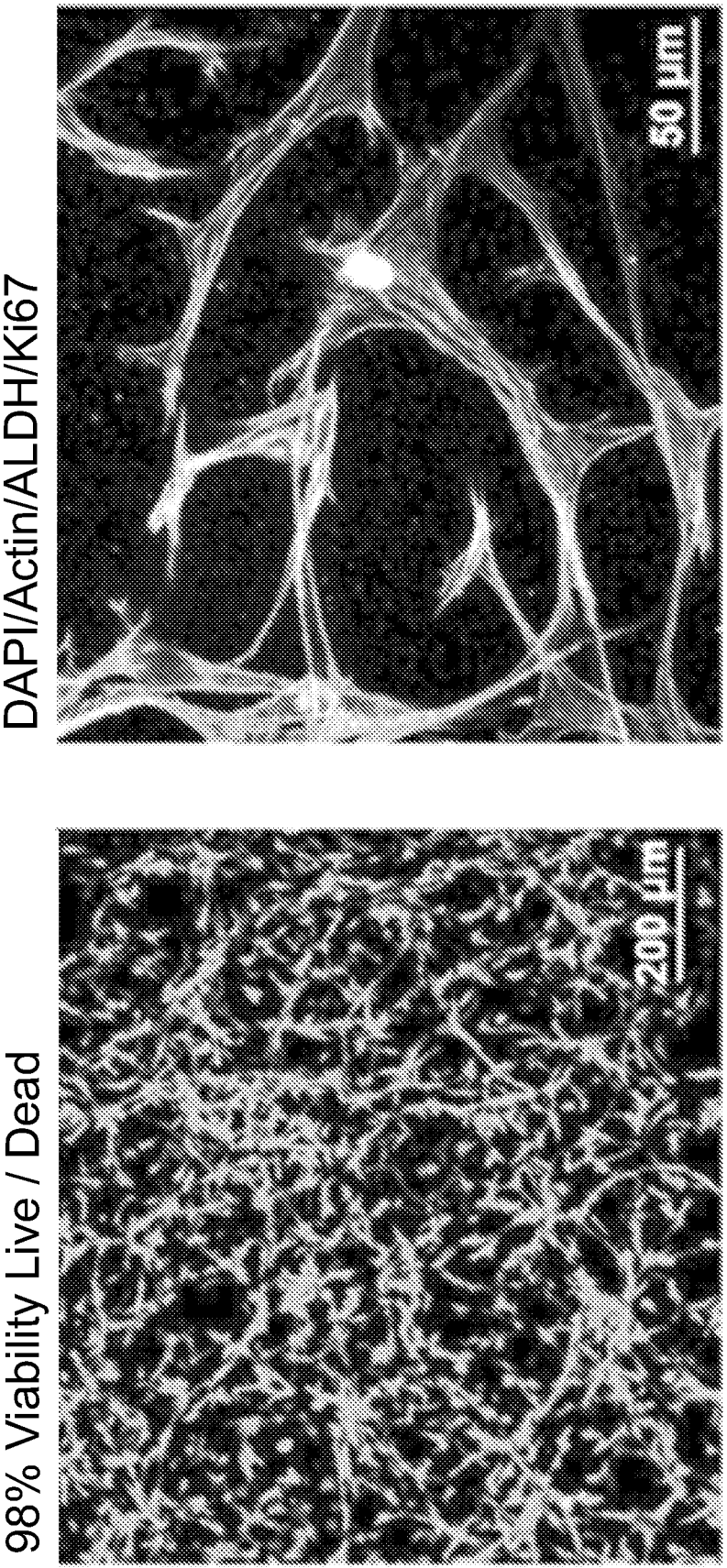
FIGS. 4A-B show according to an exemplary embodiment of the invention human corneal mesenchymal stromal cells and neural progenitor cell spheroids are supported in gelatin and PEG UNION bioinks, respectively.
Figure 9A:
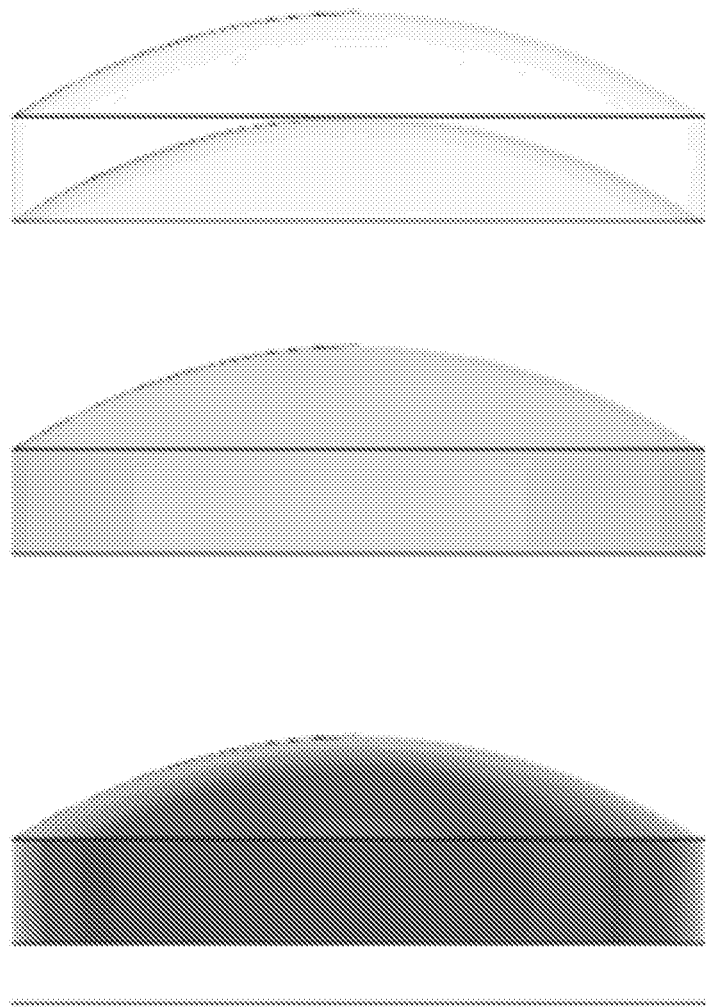
FIGS. 9A-C show according to an exemplary embodiment of the invention a method of printing cornea shapes: Gelatin-BCN with embedded corneal mesenchymal stromal cells (c-MSCs) crosslinked with diazide-PEG.
Figure 9B:
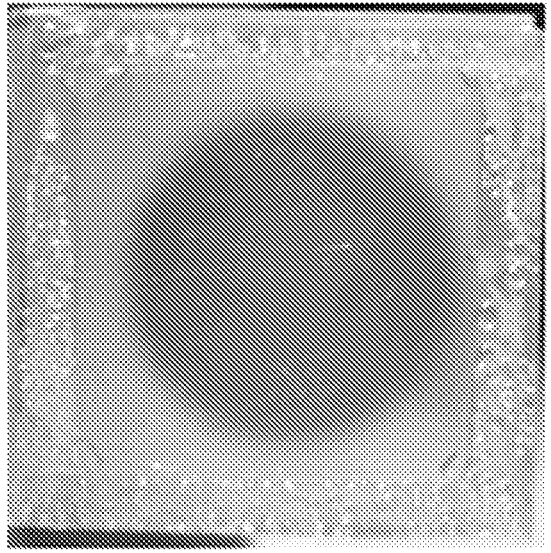
Figure 9B:
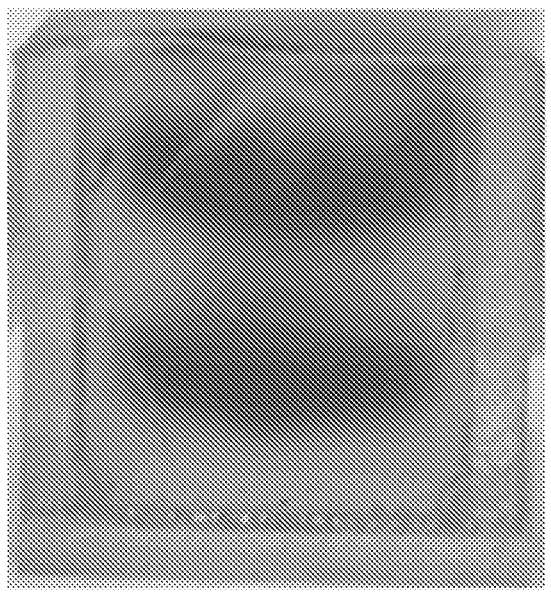
Figure 9C:
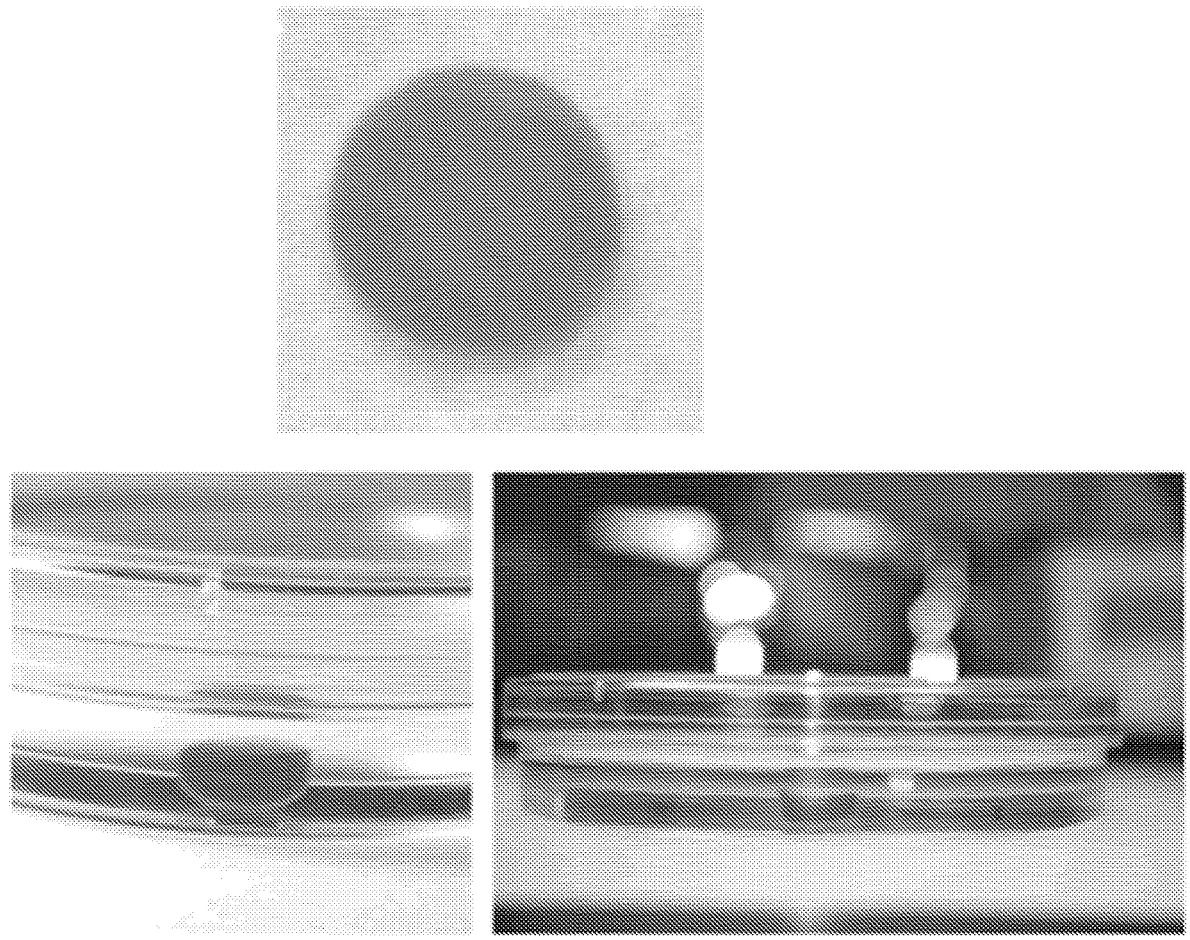
Figure 10A:
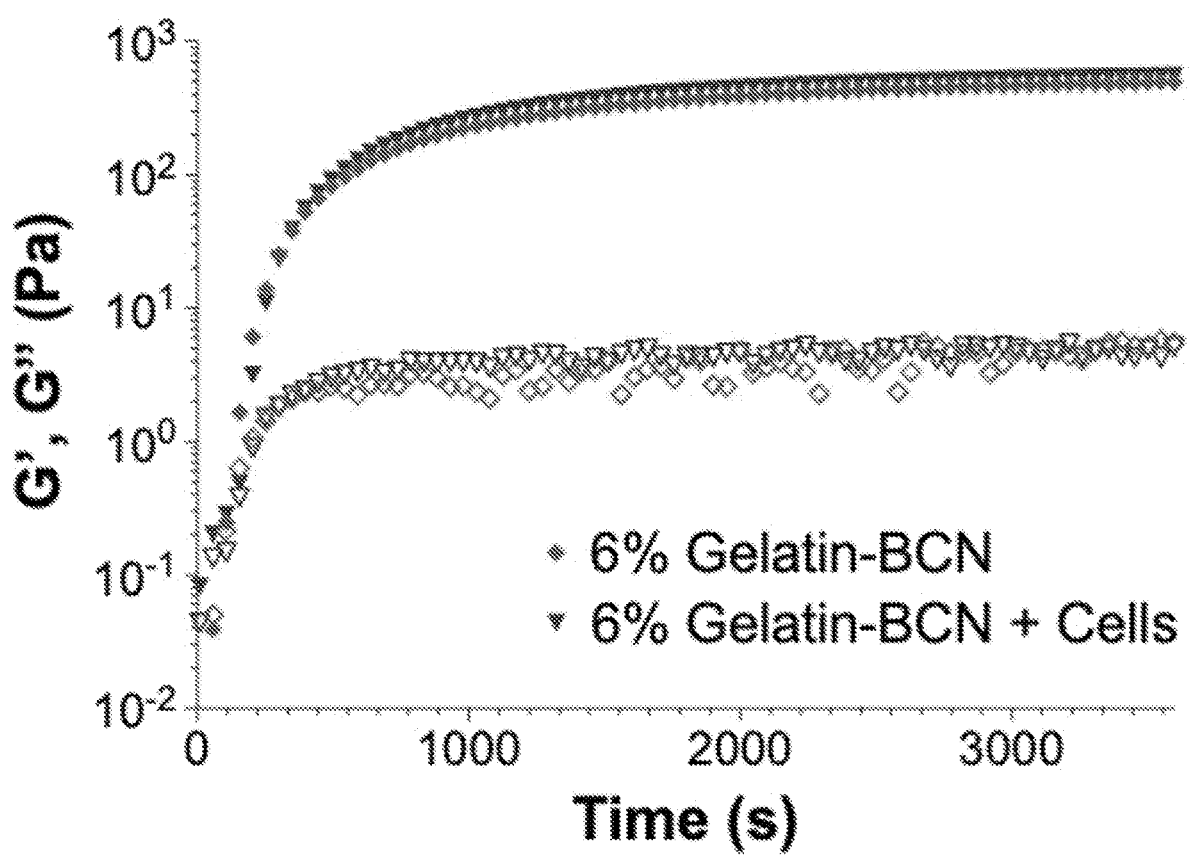
FIGS. 10A-B show according to an exemplary embodiment of the invention that gel formation kinetics (FIG. 10A) and final mechanical properties (FIG. 10B) of a gel (Gelatin-BCN with diazide-PEG) are unaffected by presence of cells due to the fact that the crosslinking reaction is bio-orthogonal (diamonds are data without cells, triangles are data with embedded cMSCs).
Figure 10B:
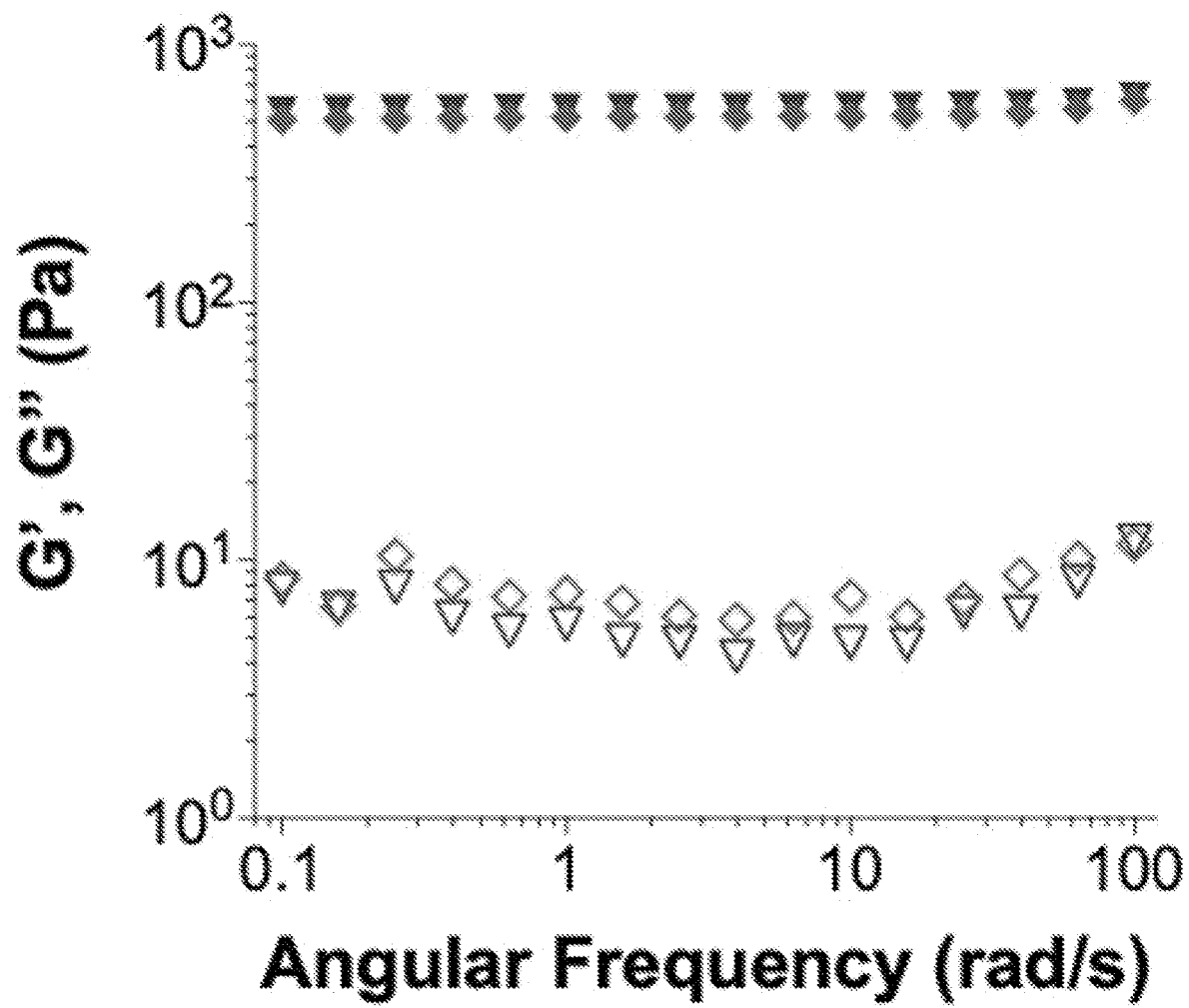

Key to the adaptability of a universal bioink system is its ability to be customized to match the desired bioprinting application. Several decades of biomaterials research have demonstrated that different cell types have different matrix requirements and that cell-matrix interactions influence cell phenotype. To demonstrate the versatility of UNION bioinks, two cell types with distinctly different matrix requirements were selected: human corneal mesenchymal stromal cells (c-MSCs) and human induced-pluripotent stem cell-derived neural progenitor cells (hiPSC-NPCs). First, c-MSCs were printed in a 6% gelatin-BCN bioink into discs (8 mm×0.5 mm) in a LIFESUPPORT™ bath with diazide-PEG crosslinkers to demonstrate a clinically relevant, mesenchymal cell type in a cell-adhesive matrix. Gelatin is a partially hydrolyzed form of collagen that contains peptide sequences known to promote cell adhesion and spreading. The printed discs were incubated for 1 hour at room temperature after printing and then heated to 37 degrees Celsius for 15 minutes to be released from the support bath. Cells remained highly viable (98%) in the gelatin-BCN bioprinted structures after 24 hours (FIG. 4A). After 7 days in culture, the c-MSCs were well-spread within the UNION gelatin bioink and stained positive for aldehyde dehydrogenase 3A1 (ALDH3A1), a corneal crystallin and a common marker of corneal stromal cells, and the proliferation marker Ki67 (FIG. 4A), suggesting that c-MSCs can proliferate in UNION bioinks. These data demonstrate that UNION bioinks can be formulated to support the viability, spreading, and proliferation of adhesion-dependent cell types. The inventors further demonstrated that the ink with embedded cells could be printed into clinically relevant structures, such as that of a corneal lens (FIGS. 9A-C). Upon printing of gelatin-BCN ink into a support bath containing diazide-PEG crosslinker, the reaction kinetics of crosslinking and the final gel mechanical properties were similar in the absence or presence of embedded c-MSCs (FIGS. 10A-B). As the crosslinking reaction is fully bio-orthogonal to the biochemistry of the cells, the cells do not participate in or modify the crosslinking reaction.

Figure 4B:
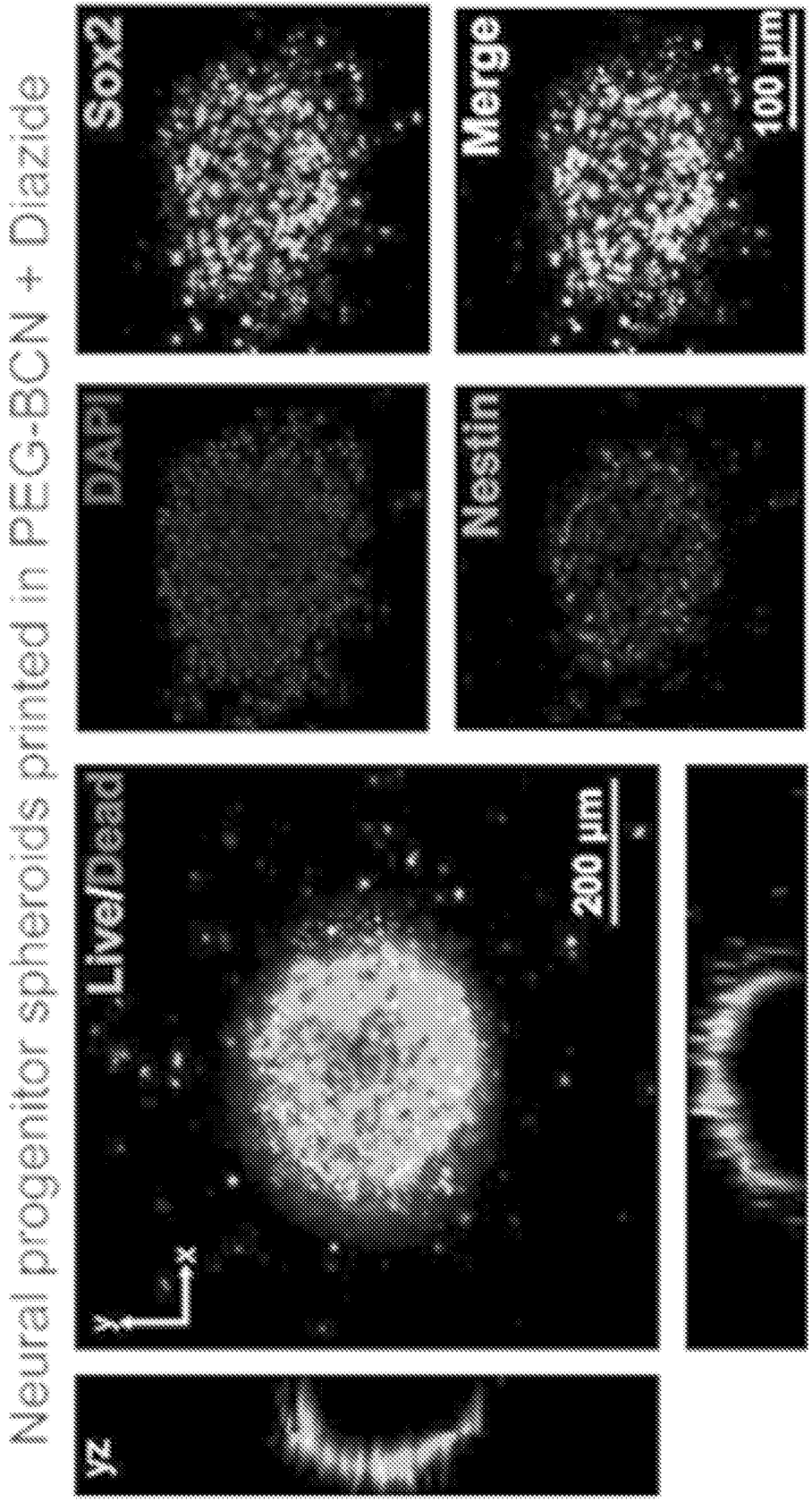
Figure 5A:
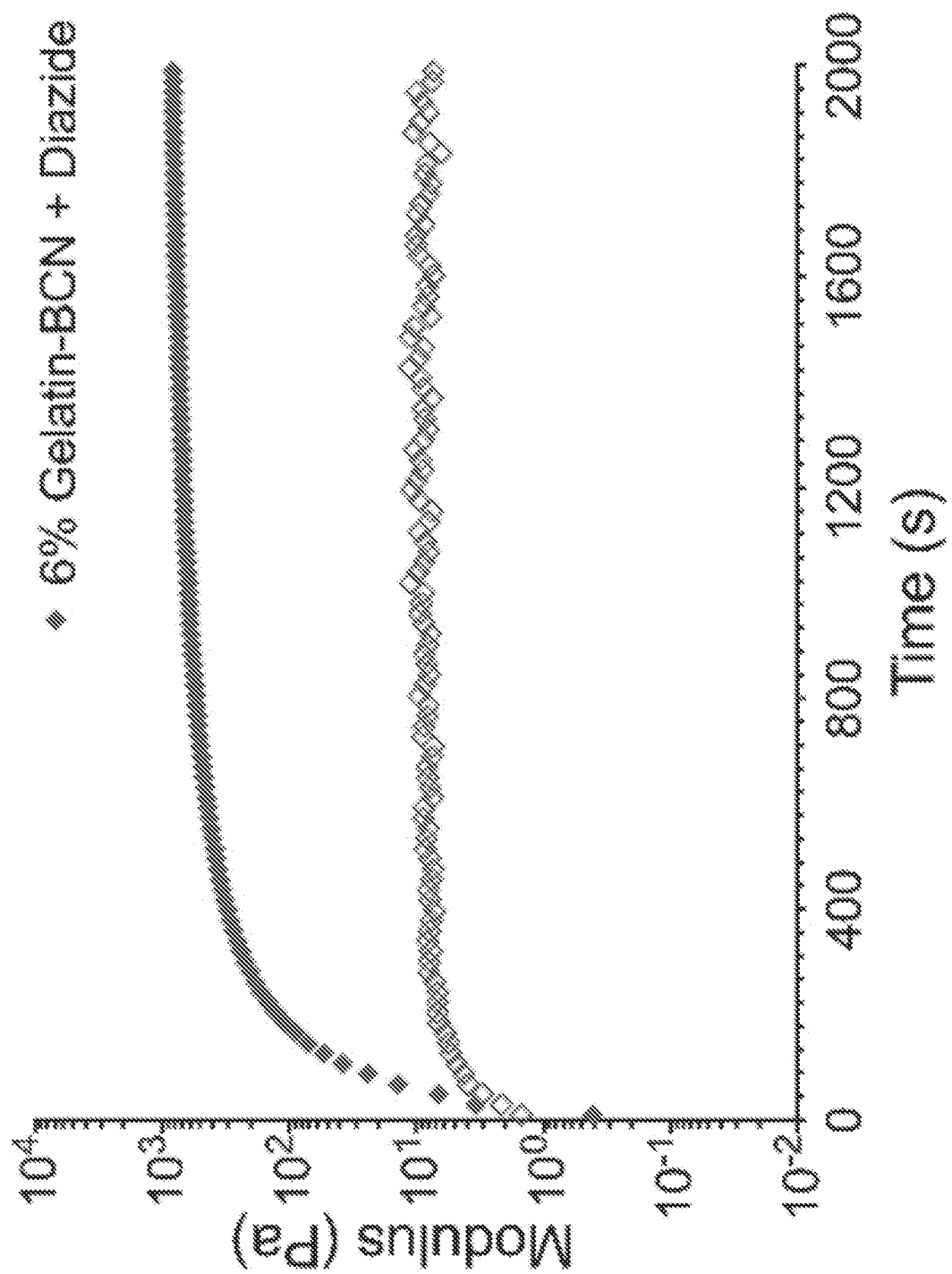
FIGS. 5A-D show according to an exemplary embodiment of the invention UNION bioinks form gels in 10 minutes. UNION bioinks form hydrogels within 5-10 minutes at room temperature after mixing with a stoichiometric amount of complementary crosslinker.
Figure 5B:
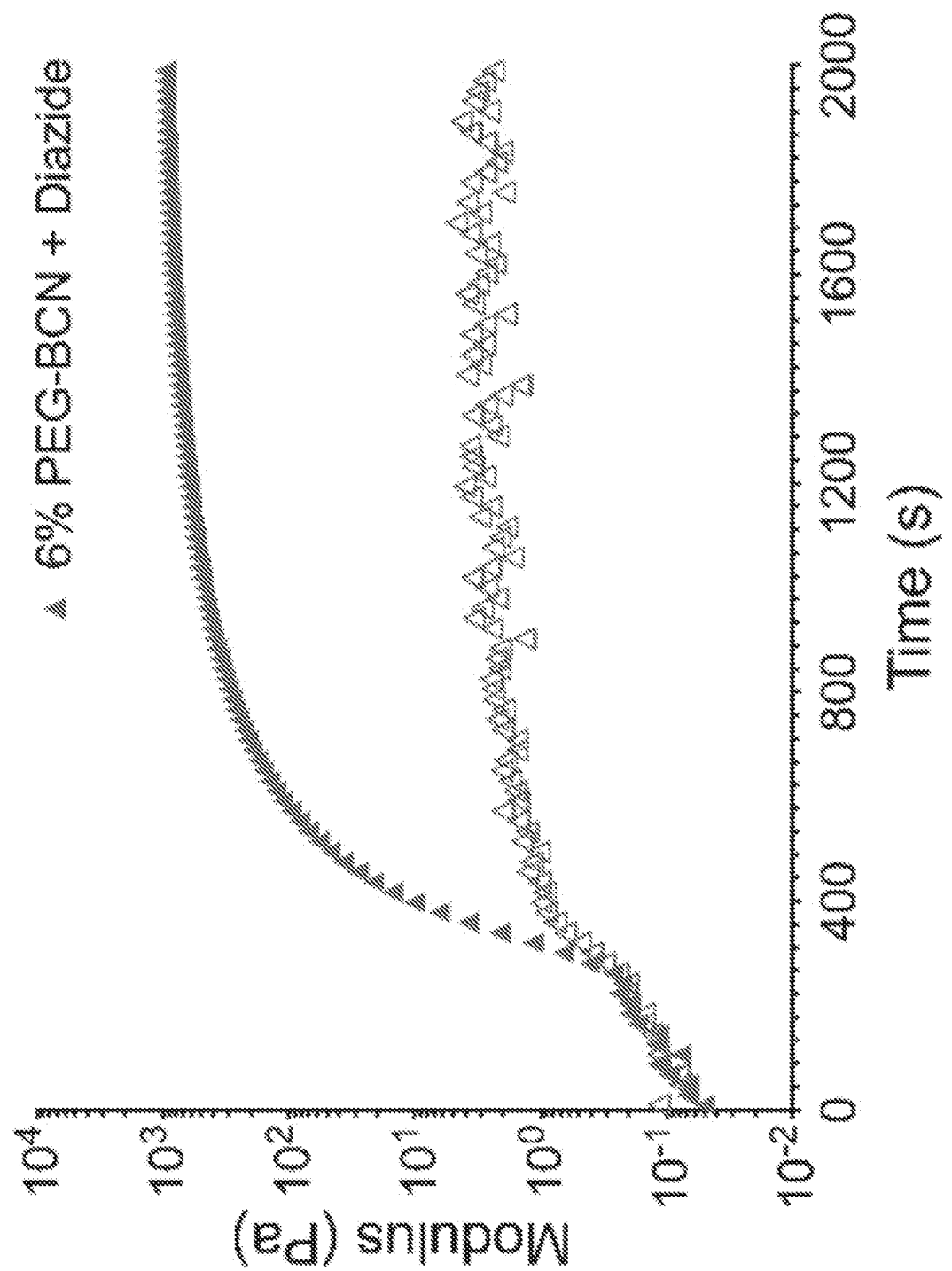
Figure 5C:
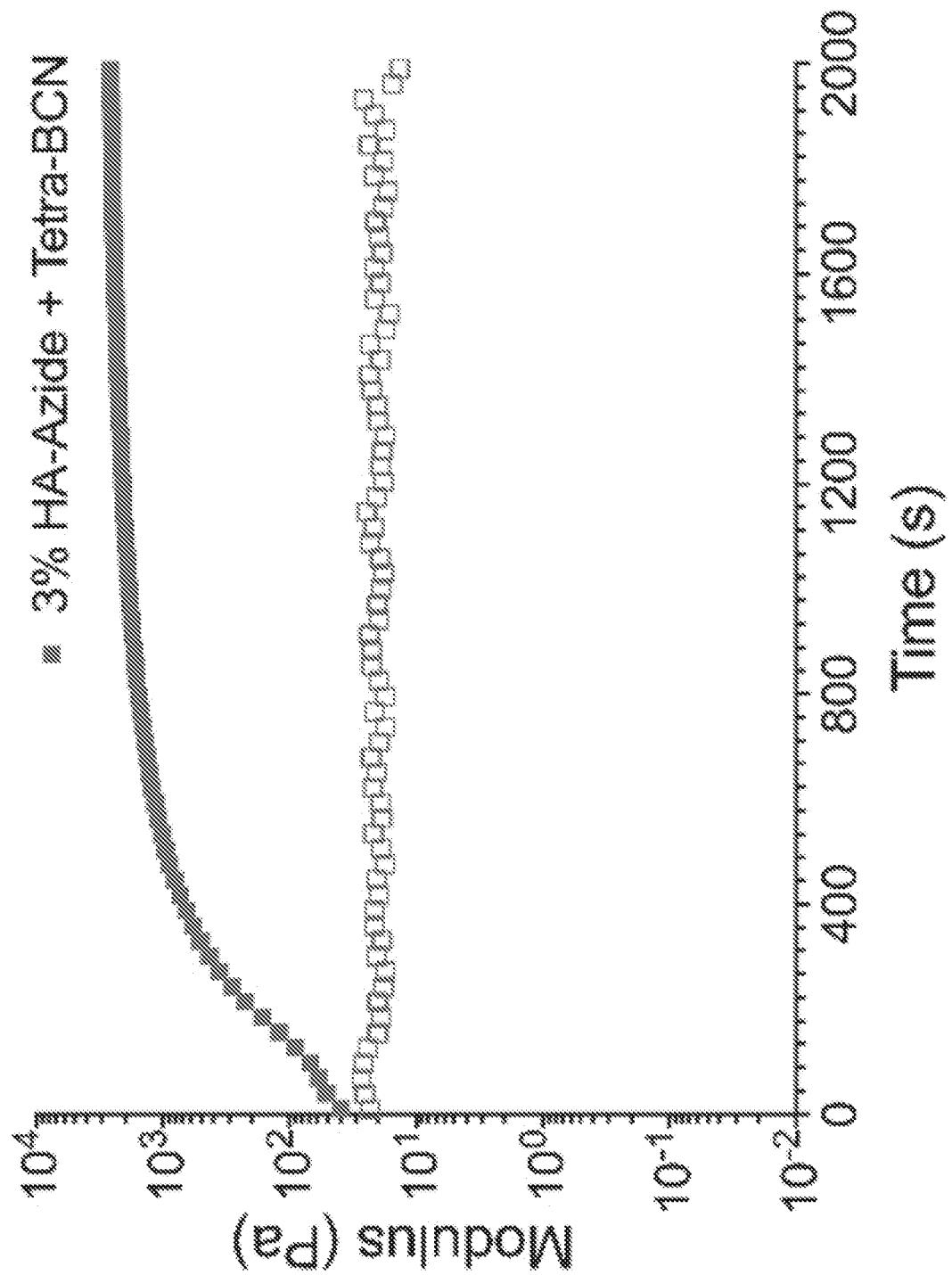
Figure 5D:
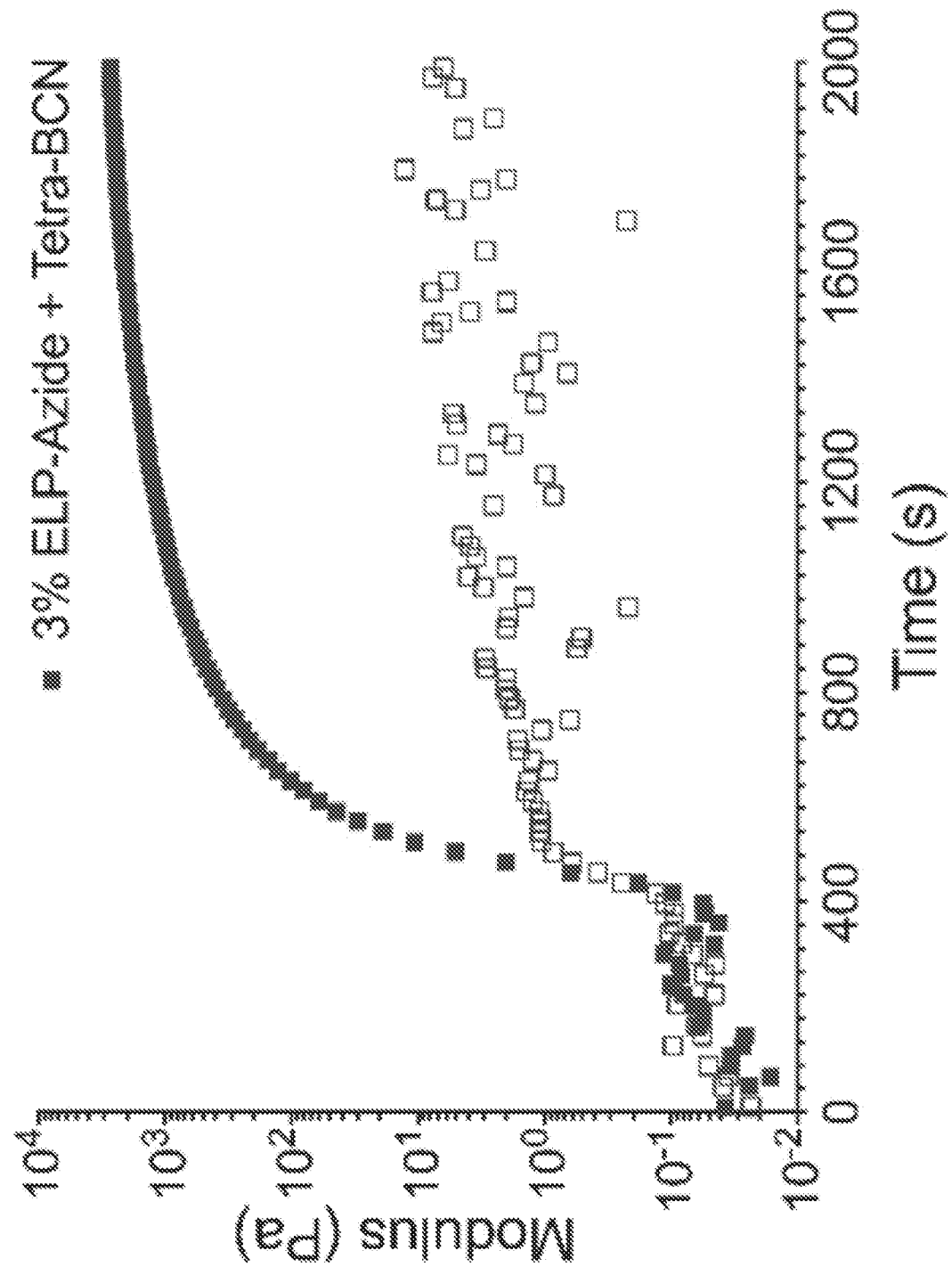
Figure 6A:
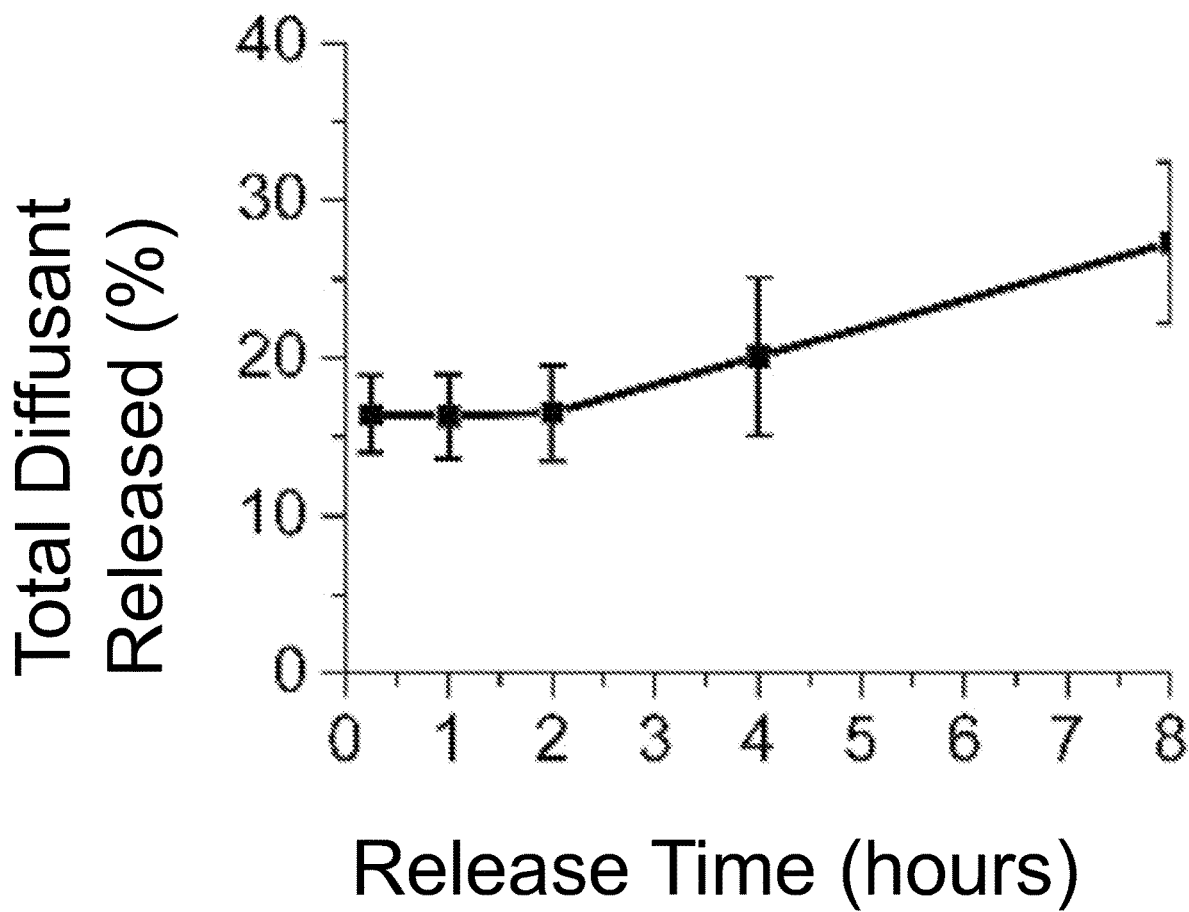
FIGS. 6A-C show according to an exemplary embodiment of the invention UNION crosslinkers diffuse through gel support baths.
Figure 6B:
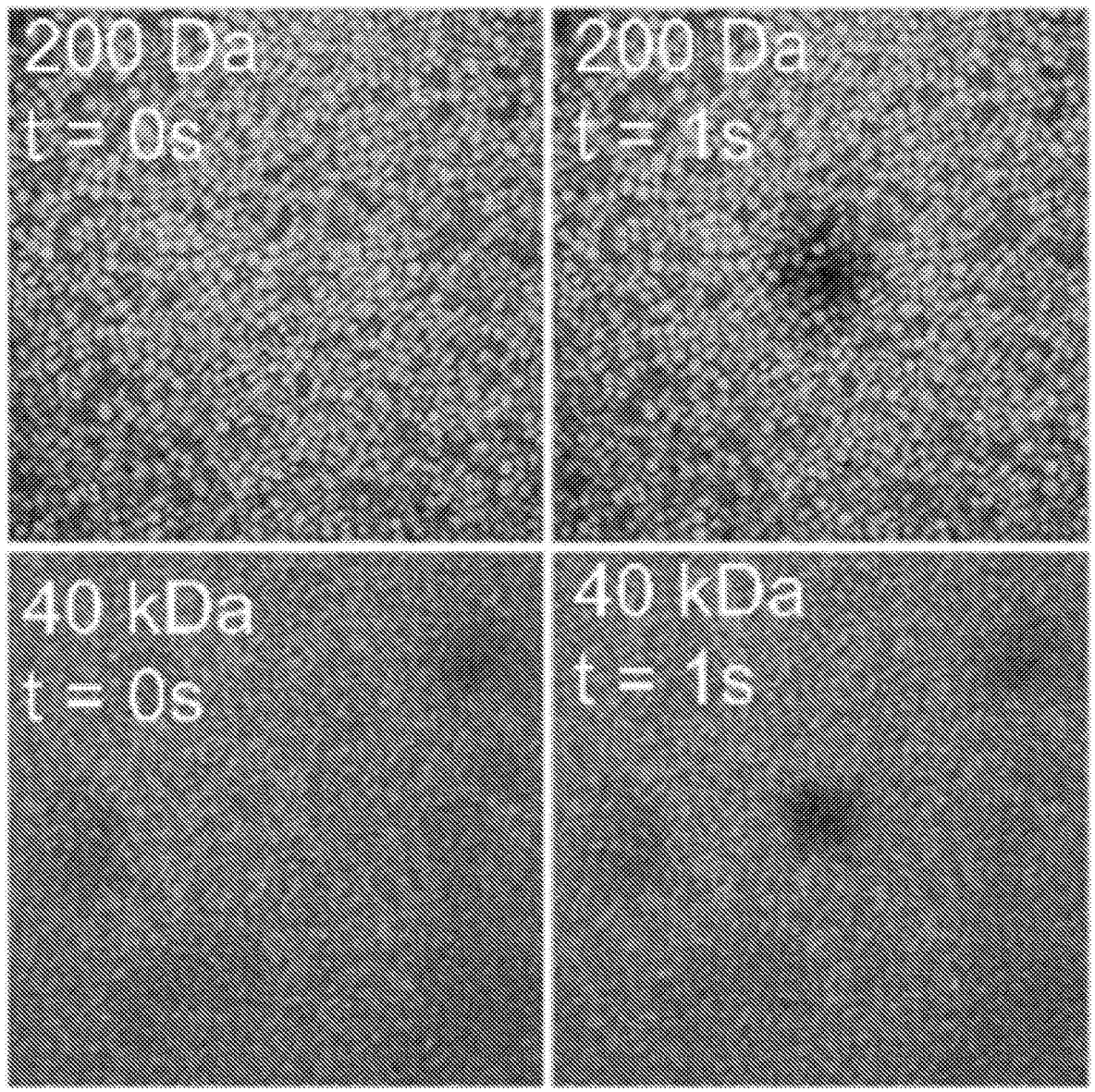
Figure 6C:
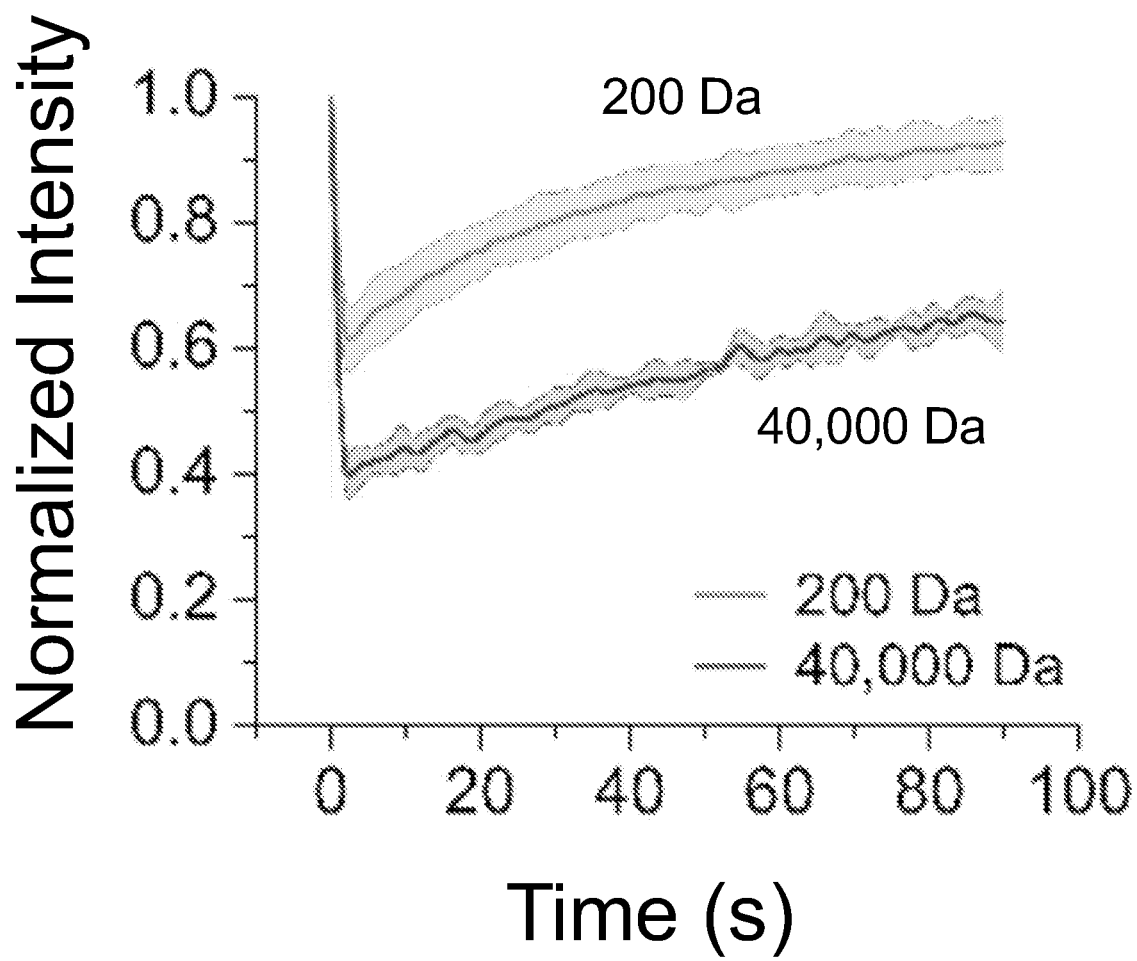

In a separate demonstration, spheroids (i.e. spherical clusters of cells) of hiPSC-NPCs were printed in a 6% PEG-BCN bioink into discs (8 mm×0.5 mm) in LIFESUPPORT™ containing diazide-PEG crosslinkers. NPCs are not matrix-adhesion-dependent and do not require matrix signaling to maintain viability, and hence can be grown within a PEG bioink lacking cell-adhesive domains. One day after printing, the interior of the spheroids contained mostly living cells, as confirmed by Live/Dead staining (FIG. 4B). In contrast, the periphery of the spheroid had a thin layer that contained isolated dead cells. This is similar to observations of decreased cell viability in printed spheroids of breast cancer cells, and is likely due to the increased size of a spheroid (~400 microns) compared to the size of a single cell (~10 microns), leading to increased fluid stresses as the bioink passes through the nozzle (d=838 microns). After 3 days of culture within the PEG bioinks, the hiPSC-NPC spheroids retained their stem-like phenotype, as demonstrated by positive staining for the neural stem cell markers Sox2 and nestin (FIG. 4B). As expected, the spheroids remained spherical in shape within the non-biodegradable, non-cell-adhesive PEG bioink. These data demonstrate that UNION bioinks can be formulated to support the viability and phenotype maintenance of non-matrix-adhesion-dependent cell types.

In summary, the UNION bioink strategy is compatible with any biopolymer amenable to chemical modification and any support bath that allows for crosslinker diffusion; thus, this universal strategy is versatile for a wide variety of potential biological applications. UNION bioinks can produce cohesive bioprinted structures from distinct bioinks since they use a common crosslinking chemistry, removing the need for separate curing strategies for each ink. The bioorthogonal nature of the crosslinking chemistry also means it has no off-target cross-reactivity with any biomolecules present on any mammalian cell type, expanding the possibility of different tissue types that can be fabricated. The inventors demonstrated that UNION bioinks can be formulated to achieve a broad range of mechanical and biochemical properties, enabling the bespoke customization of each bioink to achieve successful printing of diverse cell types. Altogether, these findings demonstrate that the UNION bioink strategy is a truly universal bioink platform, and this strategy enables multi-material and multi-cellular bioprinting of complex mimics of in vivo architectures and may enhance the translational and therapeutic potential of 3D bioprinting technology.

Methods and Materials

Bioink and Crosslinker Synthesis

The four exemplary materials used as UNION bioinks (Gelatin-BCN, PEG-BCN, HA-azide, and ELP-azide) and the tetra-BCN-PEG crosslinker were all synthesized using carbodiimide chemistry. Briefly, to synthesize gelatin-BCN and PEG-BCN, either gelatin (Type A, 200 Bloom, MP Biomedicals) or PEG-amine (4-arm 20 kDa for crosslinker, 8-arm 40 kDa for bioink, Creative PEGworks) was dissolved at 10 mg/mL in anhydrous dimethyl sulfoxide (DMSO, Fisher). (1R, 8S, 9S)-bicyclo[6.1.0]-non-4-yn-9yl-methyl N-succinimidyl carbonate (BCN-NHS, Sigma) was then added dropwise to the polymer solution to achieve a concentration of 1 molar equivalent (NHS relative to amine groups) for PEG-amine or 0.5 molar equivalent for gelatin. Triethylamine (Fisher) was added as a basic catalyst at 1.5 molar equivalents relative to NHS. The reaction was purged with nitrogen and allowed to proceed overnight at room temperature with constant stirring. To prepare ELP-azide, first the recombinant ELP (37 kDa, includes 10 primary amines and a cell-adhesive Arg-Gly-Asp peptide sequence) was expressed in *Escherichia coli* and purified as described previously.[45] ELP was dissolved at 10 mg/mL in anhydrous DMSO (Fisher) to which was added 1 molar equivalent of azido-PEG4-succinimydyl ester (Azido-PEG4-NHS, BroadPharm), along with 1.5 molar equivalents of triethylamine (Fisher). The reaction was purged with nitrogen and allowed to proceed overnight at room temperature with constant stirring. To produce HA-azide, a tetrabutylammonium (TBA) salt of HA (40 kDa, Life-Core) was prepared from its sodium salt form by counterion exchange to increase solubility. To synthesize HA-azide, the HA-TBA salt was dissolved at 10 mg/mL in anhydrous DMSO. To achieve 30% modification, 1.5 molar equivalents of 1-ethyl-3-(3-dimethylaminopropyl)carbodiimide hydrochloride (EDC, Thermo Fisher), 1.5 molar equivalents of N-hydroxysuccinimide (NHS, Thermo Fisher), 1.5 molar equivalents of 3-azidopropyl-amine (Click Chemistry Tools), and 3 molar equivalents of the basic catalyst 4-methylmorpholine (Sigma) were added to the HA solution. The reaction was allowed to proceed overnight at room temperature with constant stirring. For all BCN- and azide-functionalized polymers, once the reaction was complete, the functionalized polymers were dialyzed against double deionized water, sterile filtered through a 0.22-µm filter, and lyophilized to produce white powders. PEG-BCN polymers were flash frozen in liquid nitrogen prior to lyophilization to prevent cryogelation during freezing. Polymers were stored at −20 degrees Celsius (gelatin-BCN, ELP-azide, HA-azide) or −80 degrees Celsius (PEG-BCN). Azide-PEG3-azide (diazide-PEG, MW 200 Da, Lumiprobe) was purchased and used as received.

Bioink and Support Bath Preparation

Lyophilized Gelatin-BCN (60 mg/mL), PEG-BCN (80 mg/mL), HA-azide (30 mg/mL), and ELP-azide (30 mg/mL) were dissolved in phosphate buffered saline (PBS) and added to a 2.5 mL Hamilton syringe for printing. Food coloring was used for acellular printing to aid in visualization of printed structures. PLURONIC™ support baths were prepared by dissolving 7.8 g PLURONIC™ F-127 (Sigma) in 30 mL of sterile, cold PBS (26% w/v) and stirring overnight at 4 degrees Celsius. UNION crosslinkers were added to the PLURONIC™ to a final concentration of 1 mg/mL; the solution was thoroughly mixed and then centrifuged to remove any bubbles. LIFESUPPORT™ (FluidForm) baths were prepared following the manufacturer's recommendations. Briefly, lyophilized LIFESUPPORT™ was hydrated using sterile, cold PBS or media containing UNION crosslinker (1 mg/mL). The hydrated slurry was centrifuged, and the supernatant was removed. Support baths were added to custom-made polycarbonate containers, centrifuged to remove any bubbles, and kept at room temperature for 1 hour, prior to use. Printing was performed with a MakerGear M2 modified into a 3D dual-extruder bioprinter based on open source designs using 27 Ga needles. 3D printed models were sliced using either Repetier Host (Hot-World GmbH & Co. KG) or Simplify3D. Printed disks were 8 mm×0.5 mm (FIGS. 2A, 2B, 3A, 4A and 4B), the printed elliptical window (FIG. 2C) was a free calibration standard for 3D printing (NIH 3D Print Exchange, Model ID 3DPX-011749), and the dual material checkerboard (FIG. 2D) was a 2×2×2 cube of alternating 2-mm cubes of gelatin-BCN and PEG-BCN. All printed structures were cured for 1 hour (37 degrees Celsius for PLURONIC™ and room temperature for LIFESUPPORT™ baths) before the support baths were melted for 15 minutes (4 degrees Celsius for PLURONIC™ and 37 degrees Celsius for LIFESUPPORT™ baths). Printed structures were removed from melted support baths and rinsed with PBS for further analysis or culture.

LIFESUPPORT™ and PLURONIC™ are two exemplary support baths used, but in general the support bath is defined as a shear-thinning, viscoelastic medium that prevents diffusion of the biopolymer biomaterial ink while enabling diffusion of the crosslinker with a diffusivity of at least 5 micron$^2$ per second or higher.

Bioink Mechanical Characterization

Mechanical testing of UNION bioinks was performed using an ARG2 stress-controlled rheometer (TA Instruments). Bioinks were mixed to the final polymer concentration with stochiometric quantities of the appropriate UNION crosslinker and added to the rheometer stage using a pipette (45 μL of bioink solution). Rheological measurements were performed using a 20-mm cone and plate geometry. Gelation time sweeps were performed at a frequency of 1 rad/s with a strain of 1%. Frequency sweeps were performed between 0.1 and 100 rad/s at a strain of 1%. All measurements were confirmed to be within the linear viscoelastic regime of the bioinks.

Diffusion Characterization

For diffusion testing, diazide-PEG was modified with fluorescein-dibenzocyclooctyne (FITC-DBCO, BroadPharm). Diazide-PEG was dissolved in anhydrous DMSO to a concentration of 3 mg/mL, and 1 molar equivalent of FITC-DBCO was added. The reaction was allowed to proceed overnight to produce diazide-PEG-FITC. Diffusional testing for the PLURONIC™ support baths was performed using custom-made dialysis chambers over the course of 24 hours. Briefly, 5-mm holes were punched into rubber septums that were affixed with a cyanoacrylate adhesive (Locktite 401) to one side of a 0.1-0.5 mL dialysis cassette (3.5K MWCO, Thermo Scientific) to produce a chamber. The other side of the cassette was sealed to prevent evaporation. Approximately 500 μL of cold 26% PLURONIC™ support bath loaded with 10 μg/mL diazide-PEG-FITC was introduced into the dialysis cassette using a syringe. 5 mL of double deionized water was added to the chamber, then 100 μL samples were collected from the chamber after 15 minutes and 1, 2, 4, and 8 hours. Total released diazide-PEG-FITC at each time point was determined by comparing fluorescence to a standard curve. A diffusion coefficient was estimated using a simple, short-time, one-dimensional diffusion model fit to the cumulative released diffusant over time.

Diffusivity within the LIFESUPPORT™ bath was assessed by fluorescence recovery after photobleaching (FRAP) experiments. Briefly, LIFESUPPORT™ was hydrated with PBS containing FITC-labelled diffusant (either 1 μg/mL diazide-PEG-FITC or 10 μg/mL 40 kDa FITC-dextran, Sigma). Approximately 150 μL of diffusant-loaded LIFESUPPORT™ was placed in a clear bottom, 96-well plate and centrifuged to remove any bubbles. FRAP experiments were performed using a confocal microscope (Leica SPE) with 30 seconds of photobleaching (100 μm×100 μm area, 488 nm laser, 100% intensity) and 90 seconds of capture time. Similarly, to quantify the diffusivity in the bioinks themselves, BCN-functionalized UNION bioinks were loaded with 2 mg/mL of nonreactive, 10-kDa FITC-dextran (Sigma) and then crosslinked with diazide-PEG using bioink to crosslinker reactive group ratios of 1:0 (i.e. no crosslinker), 2:1, or 1:1. Crosslinked bioinks were cured at room temperature for 1 hour to ensure full crosslinking prior to FRAP experiments. Diffusion coefficients for each of the conditions were calculated using the open source MATLAB code 'frap analysis' based on the Hankel transform method.

Cell Culture and Analysis

All UNION bioinks for cell studies were dissolved in the appropriate fresh cell culture medium to their final concentration, and cell-containing bioinks were printed as 8 mm×0.5 mm discs into sterile LIFESUPPORT™ baths hydrated with medium and 1 mg/mL diazide-PEG.

Human corneal mesenchymal stromal cells (c-MSCs) were isolated from donor corneas (Lions Eye Institute for Transplant and Research) according to established protocols and expanded in growth medium (MEM-Alpha (Corning), 10% fetal bovine serum (Gibco), GlutaMax (Gibco), non-essential amino acids (Gibco), and Antibiotic-Antimycotic, which contains penicillin, streptomycin, and Amphotericin B (Gibco)). Prior to printing, c-MSCs were trypsinized, counted, pelleted, and resuspended in 6% w/v gelatin-BCN at a cell density of $3\times10^6$ mL$^{-1}$ and placed in a 2.5 mL Hamilton syringe with 27 Ga needle for printing. Following printing, c-MSC-laden constructs were maintained in growth medium, and the medium was changed daily.

Human induced pluripotent stem cells (hiPSCs, line number 511.3) were graciously provided to the inventors. hiPSC-neural progenitor cell (hIPSC-NPCs) were differentiated and formed spheroids in accordance with previously described protocols. To generate cell clusters of equal sizes (herein defined as approximately 5,000 cells per cluster) for differentiation, hiPSCs were dissociated into single cells with Accutase (Corning), centrifuged in AggreWell plates (Stemcell Technologies), and incubated within the AggreWell plate for 48 hr in Essential 8 (E8) medium (ThermoFisher Scientific) supplemented with the RHO/ROCK inhibitor Y-27632 (Stemcell Technologies). To initiate neural differentiation, hiPSC clusters were lifted from the Aggrewell plate and cultured within ultra-low-attachment plastic dishes (Corning) in Essential 6 (E6) medium (ThermoFisher Scientific) supplemented with two SMAD pathway inhibitors: 100 nM LDN-193189 (Cayman Chemical Company) and 10 μM SB-431542 (Tocris Bioscience). Neural spheroids were used at day 7 following treatment with the two SMAD pathway inhibitors. The spheroids were removed from their culture dishes and resuspended in 8% w/v PEG-BCN, then the bioink was loaded into a 2.5 mL Hamilton syringe with 18 Ga needle and printed. Following printing, spheroid-laden constructs were maintained in neural medium consisting of Neurobasal-A (1×, Thermo Fisher Scientific), 1% N-2 Supplement (ThermoFisher Scientific), 2% B-27 Supplement minus vitamin A (ThermoFisher Scientific), GlutaMax (Gibco) and Non-Essential Amino Acids (MEM NEAA, Gibco).

Cell viability was assessed using Live/Dead staining (Life Technologies) following the manufacturer's instructions. For immunofluorescence imaging, individual printed disk samples were fixed in 4% paraformaldehyde and permeabilized with a 0.25% Triton X-100 in PBS solution. Permeabilized samples were blocked with 5% bovine serum albumin (BSA, Roche) and 5% goat serum (Gibco) and then rinsed thoroughly. Each sample was treated with the appropriate primary antibody overnight at 4 degrees Celsius: for c-MSCs, Ki-67 (mouse, Cell Signaling, 9449, 1:400 dilution) and aldehyde dehydrogenase 3a1 (rabbit, Abcam, ab76976, 1:200); for neural spheroids, nestin (mouse, BD Pharmingen, 556309, 1:400) and Sox2 (rabbit, Millipore, AB5603, 1:400). Samples were then washed and stained with the appropriate secondary antibodies overnight at 4 degrees Celsius: AF488 goat anti-rabbit (Invitrogen, A11034, 1:500) and AF647 goat anti-mouse (Invitrogen, A21242, 1:500). Samples were washed again and then incubated with DAPI (Molecular Probes, 1:1000) and/or TRITC-phalloidin (Sigma Aldrich, 1:100). Samples were mounted with antifade reagent (Cell Signaling Technologies) on coverslips and imaged using a Leica SPE confocal microscope.

TABLE 1

A list of example materials and chemistries that could be used for each of the diffusive bioorthogonal crosslinking bioink components. As these are exemplary embodiments, this list is not exhaustive and other potential materials and chemistries are feasible and within the scope of this invention.

| Component | Identity | Concentration (mg/mL) | Comments |
| --- | --- | --- | --- |
| Component 1: Bioink polymer backbone | Collagen | 1-10 | From any source |
| | Gelatin | 5-100 | |
| | Polyethylene glycol | 1-200 | Branched/dendrimer |
| | Dextran | 1-100 | Low polymer concentrations are possible with large MWs |
| | Alginate | 1-100 | Low polymer concentrations are possible with large MWs |
| | Chitosan | 1-100 | Low polymer concentrations are possible with large MWs |
| | Elastin-like proteins | 5-120 | |
| | Hyaluronic acid | 1-100 | |
| Component 2: Diffusive Crosslinker | Polyethylene glycol | 0.1-100 | 2-, 3-, 4-, 8-armed |
| | Dextran | 0.1-100 | Branched and low MW |
| | Hyaluronic acid | 0.1-100 | |
| Bioorthogonal Chemistry Scheme | Strain promoted azide-alkyne cycloaddition | N/A | Fast gelation rates (100s of seconds) |
| | Staudinger ligation | N/A | Intermediate gelation rates (1000s of seconds) |
| | Diels-Alder and Inverse-Electron Demand Diels-Alder | N/A | Slow gelation rates (10,000s of seconds) |
| | Nitrile oxide cycloaddition | N/A | Fast gelation rates (100s of seconds) |
| Component 3: Support Bath | FRESH | N/A | Microparticle slurry made from gelatin |
| | Carbopol | N/A | Microgel slurry and commercially available |
| | PLURONIC ™ F127 | N/A | Hydrogel and commercially available |
| | Alginate | N/A | |

TABLE 2

A list of example complementary chemical groups that could be presented from the biopolymer and the crosslinker. As these are exemplary embodiments, this list is not exhaustive and other potential materials and chemistries are feasible and within the scope of this invention.

| Bioorthogonal Chemistry Scheme | Chemical Group 1 | Chemical Group 2 |
| --- | --- | --- |
| Strain promoted azide-alkyne cycloaddition | strain-promoted alkyne | azide |
| | dibenzylcyclooctyne | azide |
| | difluorinated cyclooctyne | azide |
| | bicyclononyne | azide |
| | azide | strain-promoted alkyne |
| | azide | dibenzylcyclooctyne |

TABLE 2-continued

A list of example complementary chemical groups that could be presented from the biopolymer and the crosslinker. As these are exemplary embodiments, this list is not exhaustive and other potential materials and chemistries are feasible and within the scope of this invention.

| Bioorthogonal Chemistry Scheme | Chemical Group 1 | Chemical Group 2 |
|---|---|---|
| | azide | difluorinated cyclooctyne |
| | azide | bicyclononyne |
| Inverse-Electron Demand Diels-Alder | tetrazine | trans-cyclooctene |
| | tetrazine | cyclopropene |
| | tetrazine | norbornene |
| | trans-cyclooctene | tetrazine |
| | cyclopropene | tetrazine |
| | norbornene | tetrazine |
| Staudinger ligation | triarylphosphine | azide |
| | azide | triarylphosphine |
| Diels-Alder | furan | maleimide |
| | fulvene | cyanoolefin |
| | fulvene | Dichloromaleic acid |
| | maleimide | furan |
| | cyanoolefin | fulvene |
| | Dichloromaleic acid | fulvene |
| Nitrile oxide cycloaddition | Nitrile oxide (or hydroximoyl chloride precursor for in situ generation of nitrile oxide) | norbornene |
| | norbornene | Nitrile oxide (or hydroximoyl chloride precursor for in situ generation of nitrile oxide) |
| Strain-promoted alkyne-nitrone cycloaddition | nitrone | cyclooctyne |
| | cyclooctyne | nitrone |

What is claimed is:

1. A method of bioprinting bioinks into a single printed structure, comprising:
   (a) mixing biological cells with biomaterial inks, wherein the biomaterial inks comprise a biopolymer backbone grafted with two or more copies of a first bio-orthogonal chemical group;
   (b) extruding the biological cells and biomaterial inks into a support bath; and
   (c) diffusing crosslinking molecules with two or more copies of a second bio-orthogonal chemical group, which are chemically complementary to the first bio-orthogonal chemical group, in the support bath containing the biological cells and biomaterial inks, whereby the crosslinking molecules react via bio-orthogonal click-chemistry between the first and second bio-orthogonal chemical groups resulting in covalently crosslinking the biomaterial inks into the single printed structure.

2. The method as set forth in claim 1, wherein the biomaterial inks are a biocompatible polymer.

3. The method as set forth in claim 1, wherein the biomaterial inks are a polyethylene glycol (PEG), a collagen, a dextran, a gelatin, a cellulose, an alginate, a chitosan, a fibronectin, a laminin, an elastin, a recombinant elastin-like protein, a hyaluronic acid (HA), a heparin, a heparan sulfate, a cellulose, or a decellularized extracellular matrix.

4. The method as set forth in claim 1, wherein the two or more copies of a first bio-orthogonal chemical group are functional groups with a strain-promoted alkyne, a dibenzylcyclooctyne, a difluorinated cyclooctyne, a bicyclononyne, an azide, a tetrazine, a norbornene, a trans-cyclooctene, a furan, a maleimide, a fulvene, a cyanoolefin dienophile, a dichloromaleic acid dienophile, a nitrile oxide, a hydroximoyl chloride, or a nitrone.

5. The method as set forth in claim 1, wherein the two or more copies of a second bio-orthogonal chemical group are functional groups with a strain-promoted alkyne, a dibenzylcyclooctyne, a difluorinated cyclooctyne, a bicyclononyne, an azide, a tetrazine, a norbornene, a trans-cyclooctene, a furan, a maleimide, a fulvene, a cyanoolefin dienophile, a dichloromaleic acid dienophile, a nitrile oxide, a hydroximoyl chloride, or a nitrone.

6. The method as set forth in claim 1, wherein the crosslinking molecule is a polyethylene glycol (PEG), a hyaluronic acid (HA), a heparin, a cellulose, or a peptide.

7. The method as set forth in claim 1, wherein the crosslinking molecule has a molecular weight of 80,000 g/mol or less.

8. The method as set forth in claim 1, wherein the crosslinking molecule has a diffusivity through the support bath of 5 microns$^2$ per second or larger.

9. The method as set forth in claim 1, wherein the support bath is a poly(ethylene oxide)-poly(propylene oxide)-poly(ethylene oxide) block copolymer, a gelatin microparticle slurry, an alginate, a gelatin, a gelatin-methacrylate, a gellan gum, an agarose, or a polyacrylic acid.

10. The method as set forth in claim 1, wherein the bio-orthogonal click-chemistry is strain promoted azide-alkyne cycloaddition Staudinger ligation, inverse-electron demand Diels-Alder, Diels-Alder, Nitrile oxide cycloaddition, or tetrazine ligation.

* * * * *

UNITED STATES PATENT AND TRADEMARK OFFICE
CERTIFICATE OF CORRECTION

| | | |
|---|---|---|
| PATENT NO. | : 12,397,495 B2 | Page 1 of 1 |
| APPLICATION NO. | : 17/637181 | |
| DATED | : August 26, 2025 | |
| INVENTOR(S) | : Sarah C. Heilshorn et al. | |

It is certified that error appears in the above-identified patent and that said Letters Patent is hereby corrected as shown below:

In the Specification

Column 1, add:
STATEMENT OF GOVERNMENT SPONSORED SUPPORT
This invention was made with Government support under contract 1808415 awarded by the National Science Foundation. The Government has certain rights in the invention.

Signed and Sealed this
Twenty-first Day of October, 2025

John A. Squires
*Director of the United States Patent and Trademark Office*